(12) United States Patent
Parikh et al.

(10) Patent No.: US 6,424,348 B2
(45) Date of Patent: Jul. 23, 2002

(54) APPLICATION PROGRAM INTERFACE FOR A GRAPHICS SYSTEM

(75) Inventors: Vimal Parikh, Santa Clara, CA (US); Robert Moore, Heathrow, FL (US); Howard Cheng, Sammamish, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/886,264

(22) Filed: Jun. 22, 2001

Related U.S. Application Data

(63) Continuation of application No. 09/723,336, filed on Nov. 28, 2000.

(51) Int. Cl.[7] ............................ G06F 15/16; G06T 15/00
(52) U.S. Cl. ....................... 345/522; 345/581; 345/503; 345/559; 345/567; 709/328; 712/205
(58) Field of Search ................................. 345/501, 503, 345/419, 551, 520, 522, 559, 567; 709/328; 712/208

(56) References Cited

U.S. PATENT DOCUMENTS

| | | |
|---|---|---|
| 4,388,620 A | 6/1983 | Sherman |
| 4,425,559 A | 1/1984 | Sherman |
| 4,570,233 A | 2/1986 | Yan et al. |
| 4,658,247 A | 4/1987 | Gharachorloo |
| 4,725,831 A | 2/1988 | Coleman |
| 4,829,295 A | 5/1989 | Hiroyuki |
| 4,862,392 A | 8/1989 | Steiner |
| 4,866,637 A | 9/1989 | Gonzalez-Lopez et al. |
| 4,901,064 A | 2/1990 | Deering |
| 4,914,729 A | 4/1990 | Omori et al. |
| 4,945,500 A | 7/1990 | Deering |
| 5,136,664 A | 8/1992 | Bersack et al. |
| 5,170,468 A | 12/1992 | Shah et al. |
| 5,392,385 A | 2/1995 | Evangelisti et al. |
| 5,392,393 A | 2/1995 | Deering |

(List continued on next page.)

FOREIGN PATENT DOCUMENTS

| | | |
|---|---|---|
| CA | 2070934 | 12/1993 |
| EP | 1 074 945 | 2/2001 |
| EP | 1 075 146 | 2/2001 |
| EP | 1 081 649 | 3/2001 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO 94/10641 | 5/1994 |

OTHER PUBLICATIONS

Photograph of Sony PlayStation II System.
Photograph of Sega Dreamcast System.
Photograph of Nintendo 64 System.

(List continued on next page.)

*Primary Examiner*—Ulka J. Chauhan
(74) *Attorney, Agent, or Firm*—Nixon & Vanderhye P.C.

(57) ABSTRACT

An interface for a graphics system includes simple yet powerful constructs that are easy for an application programmer to use and learn. Features include a unique vertex representation allowing the graphics pipeline to retain vertex state information and to mix indexed and direct vertex values and attributes; a projection matrix value set command; a display list call object command; and an embedded frame buffer clear/set command.

4 Claims, 21 Drawing Sheets

U.S. PATENT DOCUMENTS

| | | | |
|---|---|---|---|
| 5,404,445 A | | 4/1995 | Matsumoto |
| 5,421,028 A | | 5/1995 | Swanson |
| 5,432,900 A | | 7/1995 | Rhodes et al. |
| 5,438,663 A | | 8/1995 | Matsumoto et al. |
| 5,457,775 A | | 10/1995 | Johnson, Jr. et al. |
| 5,504,917 A | | 4/1996 | Austin |
| 5,594,854 A | | 1/1997 | Baldwin et al. |
| 5,608,424 A | | 3/1997 | Takahashi et al. |
| 5,671,401 A | * | 9/1997 | Harrell ..................... 345/441 |
| 5,687,357 A | | 11/1997 | Priem |
| 5,701,444 A | | 12/1997 | Baldwin |
| 5,721,947 A | | 2/1998 | Priem et al. |
| 5,727,192 A | | 3/1998 | Baldwin |
| 5,751,295 A | | 5/1998 | Becklund et al. |
| 5,764,243 A | | 6/1998 | Rosenthal et al. |
| 5,768,626 A | | 6/1998 | Munson et al. |
| 5,768,629 A | | 6/1998 | Wise et al. |
| 5,774,133 A | | 6/1998 | Neave et al. |
| 5,777,629 A | | 7/1998 | Baldwin |
| 5,798,770 A | | 8/1998 | Baldwin |
| 5,801,706 A | | 9/1998 | Fujita et al. |
| 5,801,716 A | | 9/1998 | Silverbrook |
| 5,805,868 A | | 9/1998 | Murphy |
| 5,808,868 A | | 9/1998 | Murphy |
| 5,815,166 A | | 9/1998 | Baldwin |
| 5,821,949 A | | 10/1998 | Deering |
| 5,870,587 A | | 2/1999 | Danforth et al. |
| 5,874,969 A | | 2/1999 | Storm et al. |
| 5,917,496 A | | 6/1999 | Fujita et al. |
| 5,920,326 A | | 7/1999 | Rentschler et al. |
| 5,920,876 A | | 7/1999 | Ungar et al. |
| 5,936,641 A | | 8/1999 | Jain et al. |
| 5,940,086 A | | 8/1999 | Rentschler et al. |
| 5,949,424 A | | 9/1999 | Cabral et al. |
| 5,949,440 A | | 9/1999 | Krech, Jr. et al. |
| 5,969,726 A | | 10/1999 | Rentschler et al. |
| 5,995,121 A | | 11/1999 | Alcorn et al. |
| 5,999,196 A | | 12/1999 | Storm et al. |
| 6,002,409 A | | 12/1999 | Harkin |
| 6,023,738 A | | 2/2000 | Preim et al. |
| 6,025,853 A | | 2/2000 | Baldwin |
| 6,028,611 A | | 2/2000 | Anderson et al. |
| 6,031,548 A | * | 2/2000 | Gueziec et al. ............. 345/440 |
| 6,037,949 A | | 3/2000 | DeRose et al. |
| 6,052,133 A | | 4/2000 | Kang |
| 6,057,852 A | | 5/2000 | Krech, Jr. |
| 6,057,863 A | | 5/2000 | Olarig |
| 6,075,540 A | * | 6/2000 | Hoppe ....................... 345/419 |
| 6,078,331 A | * | 6/2000 | Pulli et al. ................. 345/423 |
| 6,092,124 A | | 7/2000 | Priem et al. |
| 6,151,602 A | | 11/2000 | Hejlsberg et al. |
| 6,173,367 B1 | | 1/2001 | Aleksic et al. |
| 6,177,944 B1 | | 1/2001 | Fowler et al. |
| 6,181,352 B1 | | 1/2001 | Kirk et al. |
| 6,198,488 B1 | | 3/2001 | Lindholm et al. |
| 6,226,012 B1 | | 5/2001 | Priem et al. |
| 6,307,551 B1 | * | 10/2001 | Gueziec et al. ............. 345/419 |

OTHER PUBLICATIONS

Whitepaper: 3D Graphics Demystified, Nov. 11, 1999, www.nvidia.com.

Whitepaper: "Z Buffering, Interpolation and More W–Buffering", Doug Rogers, Jan. 31, 2000, www.nvidia.com.

Whitepaper: Using GL_NV_vertex_array and GL_NV_fence, posted Aug. 1, 2000, www.nvidia.com.

Whitepaper: Anisotropic Texture Filtering in OpenGL, posted Jul. 17, 2000, www.nvidia.com.

Whitepaper: Mapping Texels to Pixels in D3D, posted Apr. 5, 2000, www.nvidia.com.

Whitepaper: Guard Band Clipping, posted Jan. 31, 2000, www.nvidia.com.

Whitepaper: Cube Environment Mapping, posted Jan. 14, 2000, www.nvidia.com.

Whitepaper: Color Key in D3D, posted Jan. 11, 2000, www.nvidia.com.

Whitepaper: Vertex Blending Under DX7 for the GeForce 256, Jan. 5, 2000, www.nvidia.com.

Whitepaper: Optimizing Direct3D for the GeForce 256, Jan. 3, 2000, www.nvidia.com.

Whitepaper: Dot Product Texture Blending, Dec. 3, 1999, www.nvidia.com.

Whitepaper: Technical Brief: AGP 4X with Fast Writes, Nov. 10, 1999, www.nvidia.com.

Technical Brief: Transform and Lighting, Nov. 10, 1999, www.nvidia.com.

Technical Brief: What's New With Microsoft DirectX7, posted Nov. 10, 1999, www.nvidia.com.

Mitchell et al., "Multitexturing in Direct X6", Game Developer, Sep. 1998, www.gdmag.com.

Vision Tek, "GeForce2 GS Graphics Processing Unit", ©2000 www.visiontek.com.

Jim Bushnell et al. "Advanced Multitexture Effects With Direct3D and OpenGL", Pyramid Peak Design & ATI Research, Inc., GameDevelopers Conference, ©1999.

Sony PlayStation II Instruction Manual, Sony Computer Entertainment Inc., ©2000.

Stand and Be Judged, Next Generation, May 2000.

PlayStation II: Hardware Heaven of Hell?, Next Generation, Jan. 2000.

Chris Charla, "Play Station II: The Latest News", Next Generation, Sep. 1999.

"First PlayStation II Gameplay Screens Revealed!", Next Generation, Sep. 1999.

Game Enthusiast Online Highlights, Mar. 18, 1999.

Game Enthusiast Online Highlights, Mar. 19, 1999.

Game Enthusiast Online Highlights, Mar. 17, 1999.

Game Enthusiast Online Highlights, Oct. 20, 1999.

Joel Easley, "PlayStation II Revealed", Game Week, Sep. 29, 1999.

Inside Sony's Next Generation Playstation, ©1999.

Press Releases, Mar. 18, 1999.

Chris Johnston, "PlayStation Part Deux", Press Start, ©1999.

Nikkei Shimbun, "Sony Making SME, Chemical and SPT into Wholly–Owned Subsidiaries", Mar. 9, 1999.

AM News: Japanese Developers Not All Sold on PS2, Next Generation, Mar. 16, 1999.

Sony To Turn PlayStation Maker Into Wholly Owned Unit–Nikkei, Dow Jones News Service, Mar. 8, 1999.

Yumiko Ono, Sony Antes Up Its Chips In Bet On New Game System, Dow Jones News Service, Mar. 4, 1999.

MacWeek.Com Gets Inside Story on Connectix VGS for Windows; Controversial Emulator of Sony PlayStation Games Cureently Available for Macs Only, Business Wire, Mar. 12, 1999.

"DexDrive Bridges Gap", The Tampa Tribune, Mar. 12, 1999.

A Microprocessor With a 128b CPU, 10 Floating–Point MAC's, 4 Floating–Point Dividers, and an MPEG2 Decoder, 1999 IEEE International Solid–State Circuits Conference, Feb. 16, 1999.

Dreamcast Instruction Manual, Sega Enterprises, Ltd., ©1998.
"Sega To Launch Video Camera for Dreamcast", Reuters Business News, Feb. 16, 2000.
David Pescovitz, "Dream On", Wired, Aug. 1999.
Randy Nelson, "Dreamcast 101: Everything You Ever Wanted To Know About Sega's Powerful New Console", Official Sega Dreamcast Magazine, Jun. 1999.
2D/3D Graphics Card User Manual, Guillemot ©1999.
Nintendo 64 Instruction Booklet, Nintendo of America, 1998.
Steven Levy, "Here Comes PlayStation II", Newsweek, Mar. 6, 2000.
David Sheff, "Sony Smackage: Test Driving The PlayStation II", Wired, Nov. 1999.
Introducing The Next Generation PlayStation, Sony Computer Entertainment Inc., ©1999.
Leadtek GTS, Aug. 3, 2000, www.hexus.net.
Voodoo 5 5500 Review, Jul. 26, 2000, www.hexus.net.
ATI Radeon 64 Meg DDR OEM, Aug., 19, 2000, www.hexus.net.
Microsoft Xbox—The Future of Gaming, Microsoft Xbox Performance Sheet, www.xbox.com.
Robert L. Cook, "Shade Trees", Computer Graphics, vol. 18, No. 3, Jul. 1984.
Wang et al., "Second–Depth Shadow Mapping", Department of Computer Science, Univ. N.C, Chapel Hill, N.C. pp. 1–7.
Peercy et al., "Efficient Bump Mapping Hardware", Computer Graphics Proceedings, Annual Conference Series, 1997.
Gustavo Oliveira, "Refractive Texture Mappig, Part One", www.gamasutra.com, Nov., 10, 2000.
John Schlag, Fast Embossing Effects on Raster Image Data, Graphics Gems IV, Edited by Paul S. Heckbert, Computer Science Department, Carnegie Mellon University, Academic Press, Inc., 1994,pp. 433–437.
James F. Blinn, "Simulationof Wrinkled Surfaces," Caltech/JPL, pp. 286–292, SIGGRAPH 78 (1978).
Tomas Möller and Eric Haines "Real–Time Rendering", AK Peters, Ltd., ©1999, pp. 127–142.
Technical Presentation: Vertex Buffers, posted Jun. 12, 2000, www.nvidia.com.
Technical Presentation: Hardware Transform and Lighting, www.nvidia.com, posted Jun. 12, 2000.
Technical Presentation: Hardware Bump–mapping Choices and Concepts, Jun. 7, 2000, www.nvidia.com.
Technical Presentation: How to Bump Map a Skinned Polygonal Model, Jun. 7, 2000, www.nvidia.com.
Technical Presentation: Computations for Hardware Lighting and Shading, Mar. 17, 2000, www.nvidia.com.
Technical Presentation: Practical Bump–mapping for Today's GPUs, Mar. 17, 2000 www.nvidia.com.
Technical Presentation: Shadows, Transparency, & Fog, Mar. 17, 2000 www.nvidia.com.
Technical Presentation: GeForce 256 Register Combiners, Mar. 17, 2000,www.nvidia.com.
Technical Presentation: TexGen & The Texture Matrix, Mar. 15, 2000 www.nvidia.com.
Technical Presentation: Toon Shading, Mar. 15, 2000, www.nvidia.com.
Technical Presentation: D3D 7 Vertex Lighting, Mar. 15, 2000, www.nvidia.com.
Technical Presentation: Per–Pixel Lighting (by S. Dietrich) Mar. 14, 2000 www.nvidia.com.
Technical Presentation: GeForce 256 and RIVA TNT Combiners, Dec. 8, 1999, www.nvidia.com.
Technical Presentation: Vertex Cache Optimization, Nov. 12, 1999, www.nvidia.com.
Technical Presentation: Vertex Blending, Nov. 12, 1999, www.nvidia.com.
Technical Presentation: Hardware Transform and Lighting, Nov. 12, 1999, www.nvidia.com.
Technical Presentation: GeForce 256 Overview, Nov. 12, 1999, www.nvidia.com.
Technical Presentation: DirectX 7 and Texture Management, Nov. 12, 1999 www.nvidia.com.
Technical Presentation: Dot Product Lighting, Nov. 12, 1999, www.nvidia.com.
Technical Presentation: Texture Coordinate Generation, Nov. 3, 1999, www.nvidia.com.
Technical Presentation: Phong Shading and Lightmaps, Nov. 3, 1999, www.nvidia.com.
Technical Presentation: The ARB_multitexture Extension, Nov. 3, 1999 www.nvidia.com.
Technical Presentation: Multitexture Combiners, Nov. 3, 1999, www.nvidia.com.
Technical Presentation: Emboss Bump Mapping, Nov. 3, 1999, www.nvidia.com.
Technical Presentation: Hardware Accelerated Anisotropic Lighting, Nov. 3, 1999 www.nvidia.com.
Technical Presentation: Guard Band Clipping, Nov. 3, 1999, www.nvidia.com.
The RenderMan Interface, Stephan R. Keith, Version 3.1, Pixar Animation Studios, Sep. 1989.
The RenderMan Interface, Version 3.2, Pixar Animation Studios, Jul. 2000, www.pixar.com.
NVIDIA Product Overview, "GeForce2Ultra", NVIDIA Corporation, Aug. 21, 2000, www.nvidia.com.
Duke, "Dreamcast Technical Specs", Sega Dreamcast Review, Sega, 2/99, www.game–revolution.com.
Marlin Rowley, "GeForce 1 & 2 GPU Speed Tests", May 11, 2000, www.g256.com.
"Dreamcast: The Full Story", Next Generation, Sep. 1998.
DirectX 7.0 Programmer's Reference, Microsoft Corporation,1995–1999 (as part of the DirectX 7.0 SDK on the Companion CD included with "Inside Direct3D", Microsoft Programming Series, Peter J. Kovach, Microsoft Press, 1999).
"Inside Direct3D", Microsoft Programming Series, Peter J. Kovach, Microsoft Press, 1999.
"OpenGL Programming Guide, The Official Guide to Learning OpenGL, Release 1", Jackie Nieder, Tom David, Mason Woo, Addision–Wesley Publishing Co., 1993.
"Procedural Elements for Computer Graphics," Second Edition, David F. Rogers, McGraw Hill,1998.
"Real–Time Rendering," Tomas Molleir, Eric Haines, AK Peters, 1999.
"Computers Graphics, Principles and Practice," Second Edition, The Systems Programming Series, Foley, van Dam, Fiener, Hughes, Addison Wesley, 1990.
"Principles of Three–Dimensional Computer Animation", Revised Edition, Michael O'Rourke, W.W. Norton & Company, 1998.

* cited by examiner

Fig. 5 EXAMPLE GRAPHICS PROCESSOR FLOW

Fig. 6  EXAMPLE GRAPHICS PROCESSING LOOP

EXAMPLE MORE DETAILED GRAPHIC PROCESSING LOOP

EXAMPLE SIMPLE GRAPHIC APPLICATION

0x4f: copy_clear_color_ar

| 23 | | | | | | | | 15 | | | | | | | | 7 | | | | | | | |
|---|---|---|---|---|---|---|---|---|---|---|---|---|---|---|---|---|---|---|---|---|---|---|---|
| | | | | | | | | alpha | | | | | | | | red | | | | | | | | red and alpha component of the color value written to efb during a copy command.
(7:0) reg
(15:8) alpha 0x50: copy_clear_color_gb

| 23 | | | | | | | | 15 | | | | | | | | 7 | | | | | | | |
|---|---|---|---|---|---|---|---|---|---|---|---|---|---|---|---|---|---|---|---|---|---|---|---|
| | | | | | | | | green | | | | | | | | blue | | | | | | | | red and alpha component of the color value written to efb during a copy command.
(7:0) blue
(15:8) green 0x51: copy_clear_z

| 23 | | | | | | | | 15 | | | | | | | | 7 | | | | | | | |
|---|---|---|---|---|---|---|---|---|---|---|---|---|---|---|---|---|---|---|---|---|---|---|---|
| z | | | | | | | | | | | | | | | | | | | | | | | |

23:0  z value written into the z efb.

Fig. 9a   EXAMPLE PIXEL ENGINE COPY CLEAR REGISTER FORMATS

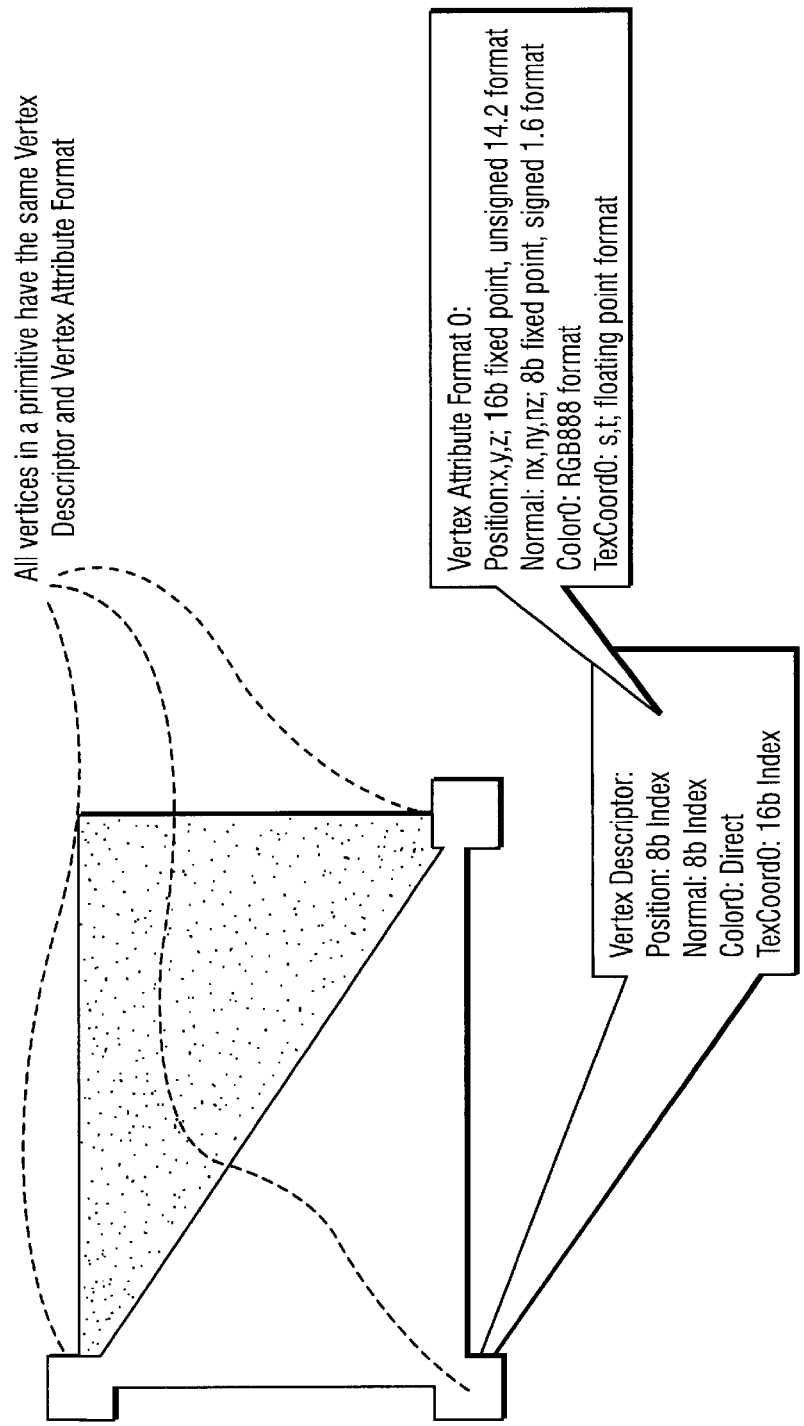
Fig. 10   EXAMPLE (VERTEX AND ATTRIBUTE DESCRIPTION)

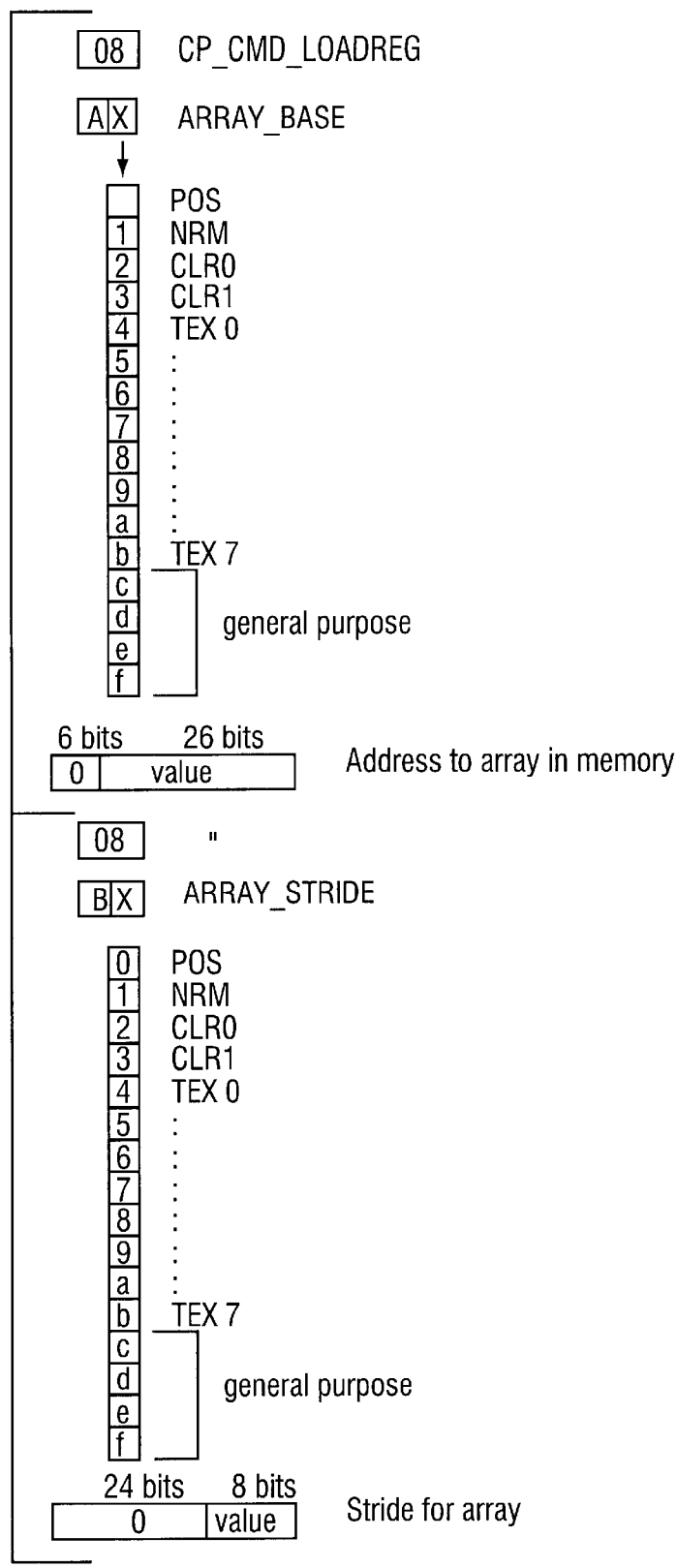
Fig. 11  GX SET ARRAY ( GX ATTR, ATTR, VOID + BASE APTR, .8 STRIDE)

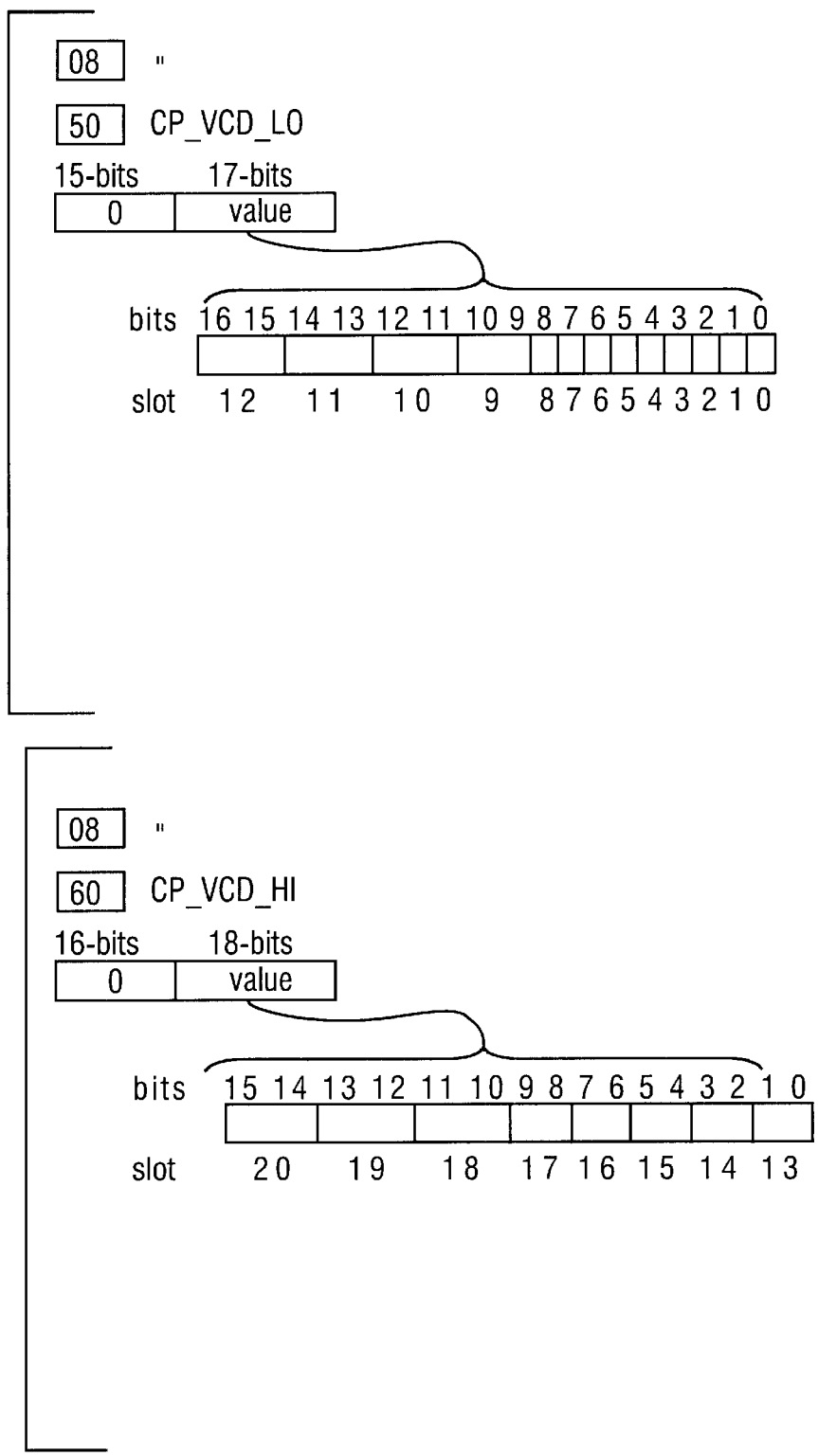
Fig. 12   GX SET VTX ATTR ATTR

|  | GX_VTXFMT0 | GX_VTXFMT1 | GX_VTXFMT2 | GX_VTXFMT3 | GX_VTXFMT4 | GX_VTXFMT5 | GX_VTXFMT6 | GX_VTXFMT7 |
|---|---|---|---|---|---|---|---|---|
| GX_VA_POS |  |  |  |  |  |  |  |  |
| GX_VA_NRM |  | n elements format/size scale |  | format/size |  |  |  |  |
| GX_VA_CLR0 |  |  |  |  |  |  | n elements format/size |  |
| GX_VA_CLR1 |  |  |  |  |  |  |  |  |
| GX_VA_TEX0 |  |  |  |  |  |  |  |  |
| GX_VA_TEX1 |  | n elements format/size scale |  |  |  |  |  |  |
| GX_VA_TEX2 |  |  |  |  |  |  |  |  |
| GX_VA_TEX3 |  |  |  |  |  |  |  |  |
| GX_VA_TEX4 |  |  |  |  |  |  |  |  |
| GX_VA_TEX5 |  |  |  |  |  |  |  |  |
| GX_VA_TEX6 |  |  |  |  |  |  |  |  |
| GX_VA_TEX7 |  |  |  |  |  |  |  |  |

Fig. 14 (VERTEX ATTRIBUTE FORMAT TABLE)

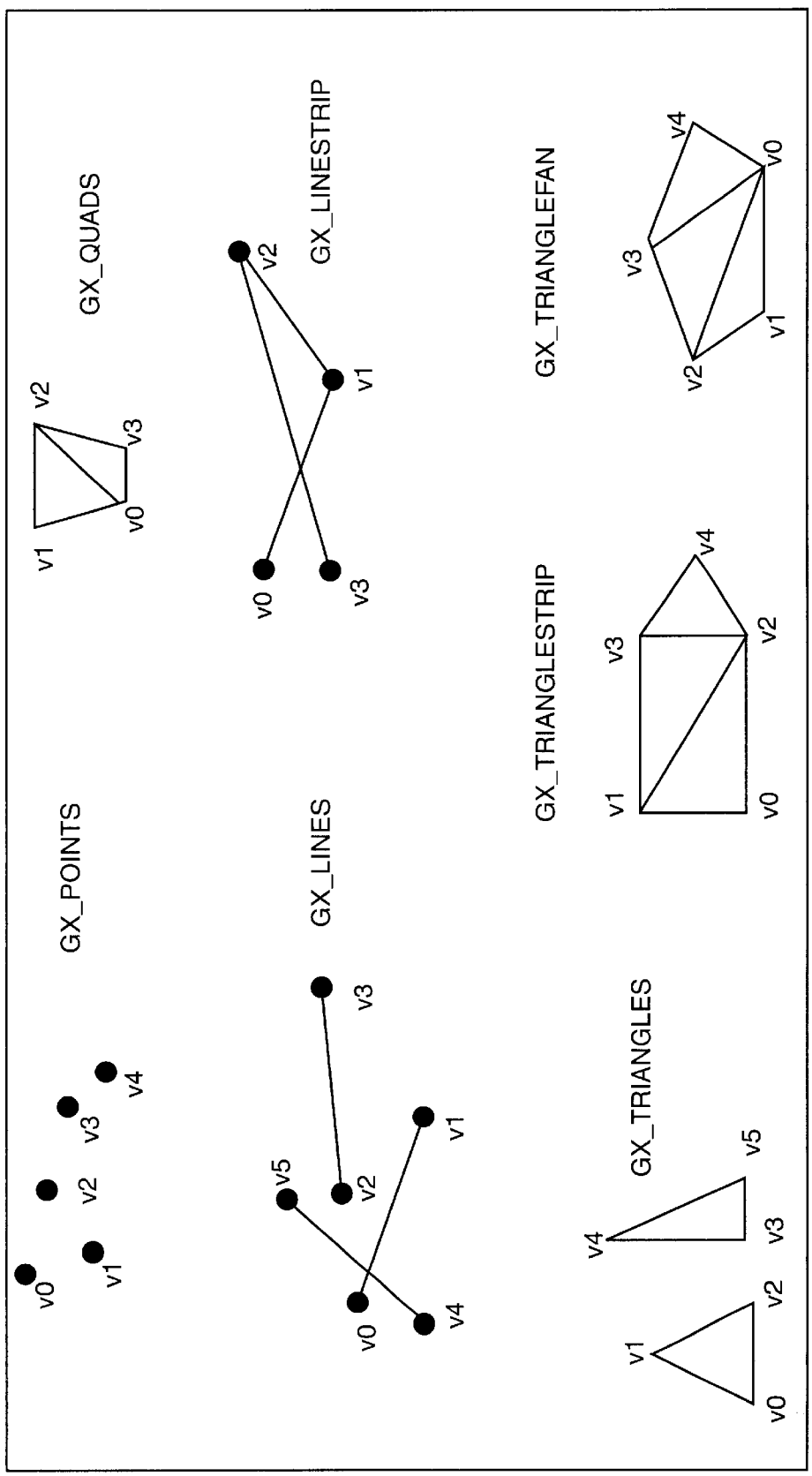
Fig. 15  EXAMPLE (GRAPHICS PRIMITIVES)

APPLICATION PROGRAM INTERFACE FOR A GRAPHICS SYSTEM

CROSS-REFERENCE TO RELATED APPLICATIONS

See the following copending patent applications incorporated herein by reference:

application Ser. No. 09/465,754, filed Dec. 17, 1999 of Moore et al. entitled "Vertex Cache For 3D Computer Graphics"; claiming benefit from provisional application No. 60/161,915, filed Oct. 28, 1999, Application Ser. No. 09/726,215, filed Nov. 28, 2000 (atty. dkt. no. 723-959), of Fouladi et al. entitled "Method and Apparatus for Buffering Graphics Data in a Graphics System" claiming benefit from provisional application No. 60/226,912 filed Aug. 23, 2000;

application Ser. No. 09/722,367, filed Nov. 28, 2000 (atty. dkt. no. 723-968) of Drebin et al. entitled "Recirculating Shade Tree Blender For A Graphics System" claiming benefit from provisional application No. 60/226,888, filed Aug. 23, 2000;

application Ser. No. 09/722,663, filed Nov. 28, 2000 (atty. dkt. no. 723-963) of Fouladi et al. entitled "Graphics System With Copy Out Conversions Between Embedded Frame Buffer And Main Memory" claiming benefit from provisional application No. 60/227,030, filed Aug. 23, 2000;

application Ser. No. 09/722,390, filed Nov. 28, 2000 (atty. dkt. no. 723-966) of Demers et al., entitled "Low Cost Graphics System With Stitching Hardware Support For Skeletal Animation" claiming benefit from provisional application No. 60/226,914, filed Aug. 23, 2000;

application Ser. No. 09/726,216, filed Nov. 28, 2000 (atty. dkt. no. 723-967) of Drebin et al., entitled "Achromatic Lighting in a Graphics System and Method" claiming benefit from provisional application No. 60/227,007, filed Aug. 23, 2000.

FIELD OF THE INVENTION

The present invention relates to computer graphics, and more particularly to interactive graphics systems including but not limited to home video game platforms. Still more particularly this invention relates to an advantageous software programming interface including binary command functions for controlling a graphics chip and to methods for generating, storing and decoding same.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64(®) and various 3D graphics cards now available for personal computers. It is now possible to interact with exciting 3D animations and simulations on relatively inexpensive computer graphics systems in your home or office.

A problem graphics system designers confronted in the past was how to provide a control interface for a graphics system that enables fast, efficient and flexible use of the graphics system by applications designed to be executed thereon. Various application programming interfaces (APIs) and application binary interfaces (ABIs) have been developed in the past for the purpose of enabling graphics application programmers to control the operation of a graphics chip provided in a graphics system. Perhaps the most commonly-used 3D graphics application programming interfaces in current use are Microsoft's Direct3D interface and the OpenGL interface developed through cooperation with Silicon Graphics. See, for example, Kovach, *Inside Direct3D: The Definitive Guide to Real-Time 3D Power and Performance for Microsoft Windows* (Microsoft Press 2000); and Neider et al., *OpenGL Programming Guide: The Official Guide to Learning OpenGL Release* 1 (Addison-Wesley Publishing Co. 1993).

As explained in the Kovach book, Microsoft's DirectX application programming interface (API) provides a set of interfaces offering efficient control of multimedia hardware on a computer running Microsoft Windows. Kovach states that DirectX lets programmers work with commands and data structures that are very close to those that the hardware can natively process, without being so low level that code has to be written differently for each device. By writing device-independent code, programmers can create software that will theoretically always perform at its best (according to Kovach)—even as users enhance their systems with new and improved 3D graphics accelerators, sound cards, input devices and other system capabilities.

Kovach explains that the device-independence of DirectX is obtained because the DirectX APIs are built on a hardware abstraction layer (HAL) that hides the device-specific dependencies of the hardware. In fact, DirectX defines some hardware acceleration support features that aren't available on much of the hardware built today in order to provide extensibility for the future.

While the DirectX approach has been widely adopted and is successful in providing compatibility across a wide range of different platform configurations, the use of a thick hardware abstraction layer and associated hardware emulation layer is not particularly suitable for current low cost dedicated video game platforms at the current time. The DirectX API was primarily designed for personal computers costing many hundreds or thousands of dollars and manufactured in a variety of different configurations and permutations. While the DirectX API has been successful in providing compatibility across a wide range of such different platform configurations, this compatibility has come at the expense of efficiency and performance. In the context of a dedicated low-cost video game platform, it is possible to do much better in terms of providing a fully capable programming interface that is very close to the hardware while providing a highly capable and flexible interface for achieving a wide variety of interesting 3-dimensional graphics effects.

One prior approach is described in U.S. patent application Ser. No. 08/990,133 filed Dec. 12, 1997 by Van Hook et al., entitled "Interface For A High Performance Low Cost Video Game System With Coprocessor Providing High Speed Efficient 3D Graphics And Digital Audio Signal Processing." However, further improvements are possible and desirable. In particular, some people criticized the interface described in this prior Van Hook et al., patent application because they thought it was difficult to write applications to. In the home video game arena, it is desirable to maximize performance while keeping the interface used to invoke and control such performance and capabilities as simple and easy to use as possible. Requiring application programmers to write to an unduly complicated interface may increase the time it takes to develop such applications. This can have devastatingly negative effects when it comes time to launch a new video game platform—since the success of the platform may often depend on achieving a certain "critical mass" in terms of the number of games or other applications available at launch time. As some developers of prior new home video game platforms found out, no one wants to buy a new video game system if there are no games to play on it. It is therefore desirable to provide a graphics programming interface that is simple and easy to use and yet is very powerful and flexible.

The present invention solves this problem by providing new and improved interface for graphics systems that is designed to be as thin as possible in order to achieve high performance, while also providing a logical and orthogonal view of the graphics hardware.

The present invention provides a graphics system programming interface with graphics commands allowing geometry to be rendered with many attributes. The interface provides two main methods for drawing geometry. An immediate mode allows the command stream source to send a stream of graphics commands directly to the graphics processor for consumption. This immediate mode interface is useful when the main processor must synthesize geometry data from a higher-level description (e.g., a height field or Bezier patch). The second method feeds a command stream to the graphics processor using a memory-resident display list format. This interface provides superior performance for static data. The immediate interface and the display list interface both support configurable vertex representations. The configurable vertex representations include, for example, direct or indexed vertex components. Vertex components (e.g., position, normal, color and texture coordinates for a number of textures) can all be indexed independently from arrays, or placed directly in the command stream. Additional flexibility is provided by allowing each vertex component to have a differently-sized representation and precision. The available direct types may include, for example, 8-bit signed and unsigned integer, 16-bit signed and unsigned integer, and 32-bit floating point. A scale is available to position the decimal point for the integer types. The indirect types (e.g., 8-bit index or 16-bit index) can be used to index into an array of any of the direct types. This flexible representation allows the game developer to organize vertex data in a way that is appropriate for the game. The ability to index each component separately eliminates a great deal of data duplication.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 9A shows example pixel engine copy clear register formats;

FIG. 10 shows an example vertex data structure hierarchy including example description information;

FIG. 11 shows an example binary level interface defining a vertex attribute array;

FIG. 12 shows an example binary level interface defining a vertex descriptor;

FIG. 14 schematically illustrates an example vertex attribute format table;

FIG. 15 shows example graphics primitives that may be represented using the vertex data structures herein;

DETAILED DESCRIPTION OF EXAMPLE EMBODIMENTS OF THE INVENTION

Figure 1:
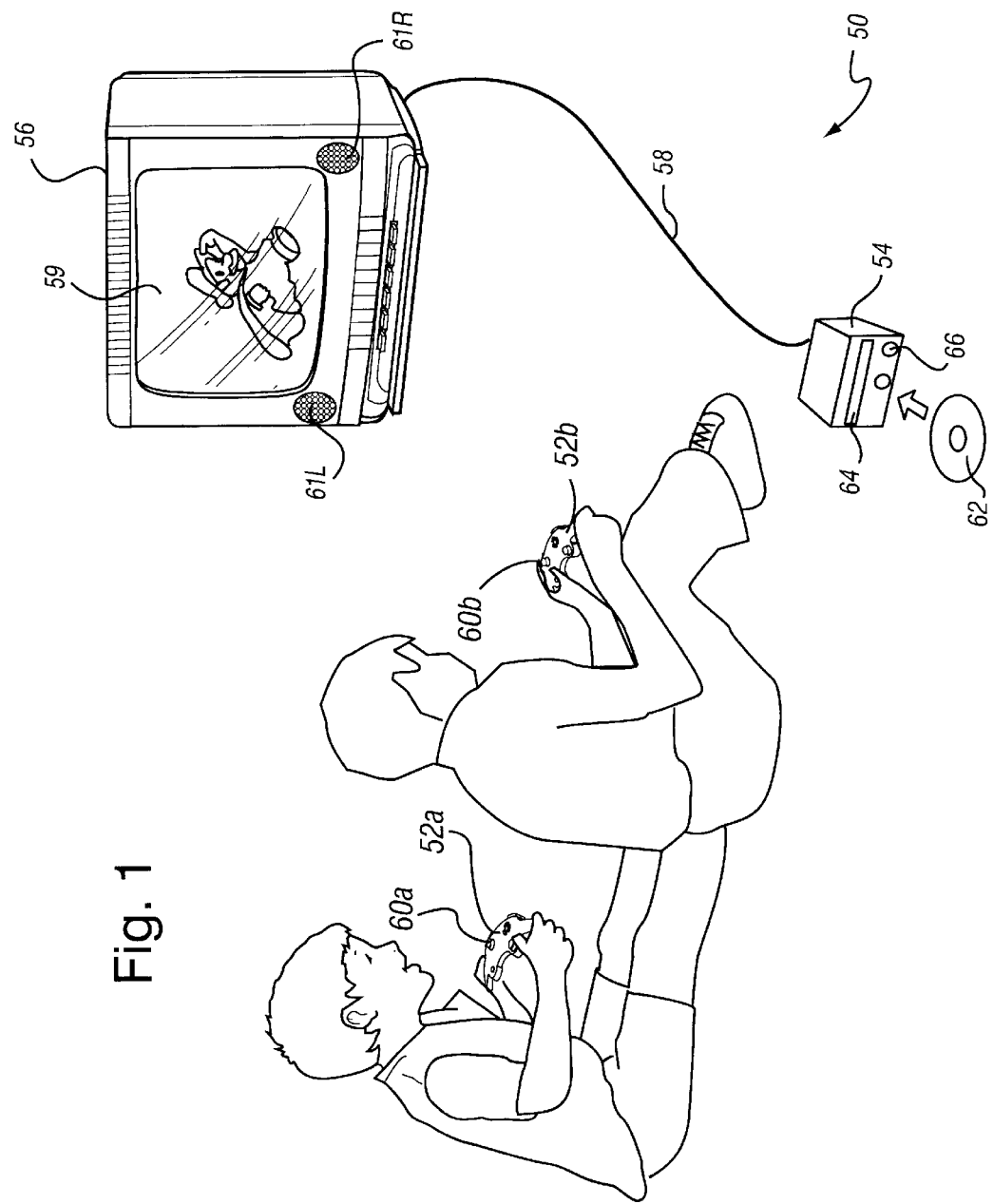
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52*a*, 52*b* or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk that stores commands for graphics and audio processor 114 and/or instructions controlling main processor 110 to develop such commands. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
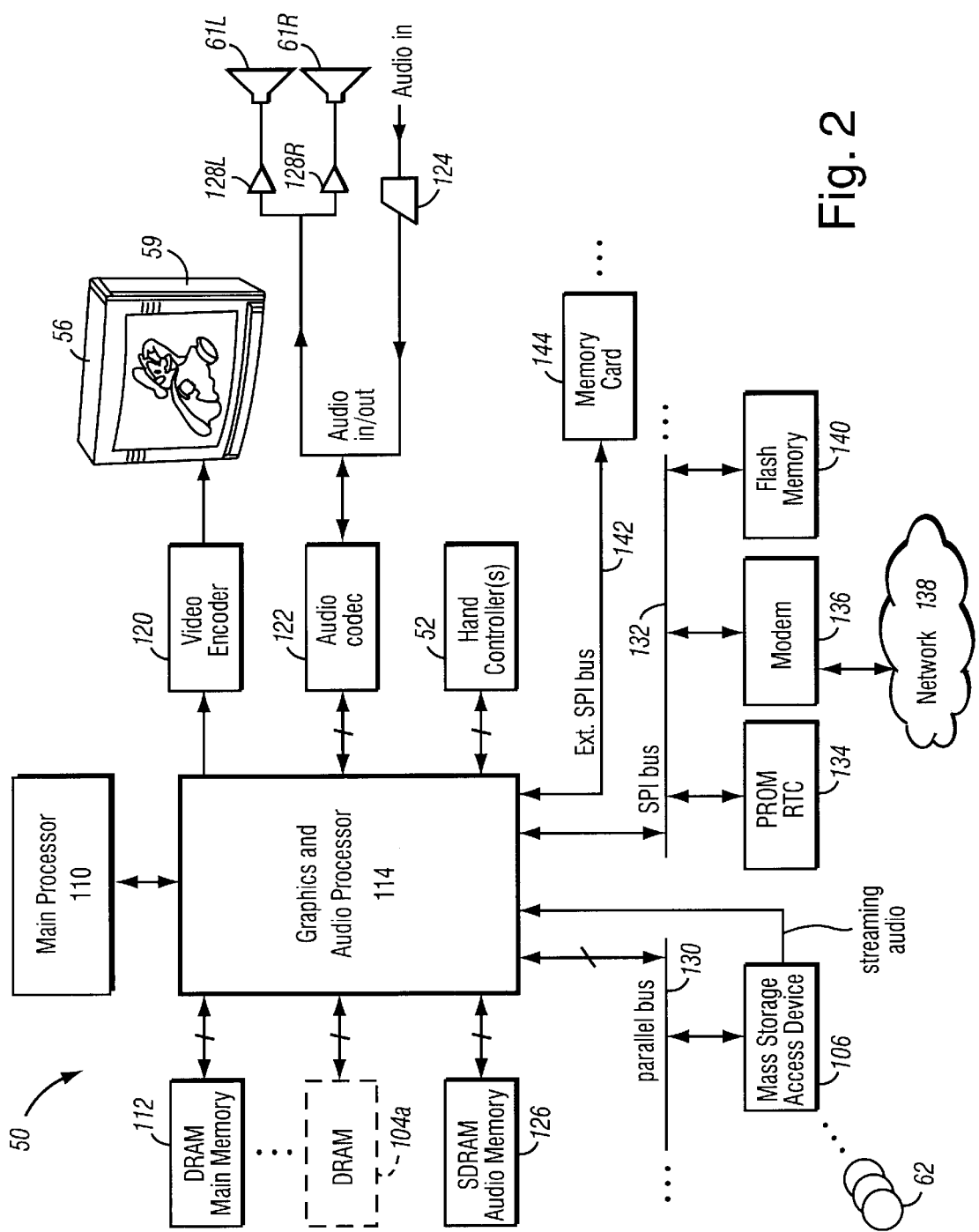
FIG. 2 is a block diagram of the FIG. 1 example computer graphics system.

FIG. 2 shows a block diagram of example components of system 50. The primary components include:

a main processor (CPU) 110, a main memory 112, and a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 100 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 100. For example, a parallel digital bus 130 may be used to communicate with mass storage access device 106 and/or other components. A serial peripheral bus 132 may communicate with a variety of peripheral or other devices including, for example:

a programmable read-only memory and/or real time clock 134, a modem 136 or other networking interface (which may in turn connect system 100 to a telecommunications network 138 such as the Internet or other digital network from/to which program instructions and/or data can be downloaded or uploaded), and flash memory 140.

A further external serial bus 142 may be used to communicate with additional expansion memory 144 (e.g., a memory card) or other devices. Connectors may be used to connect various devices to busses 130, 132, 142.

Example Graphics and Audio Processor

Figure 3:
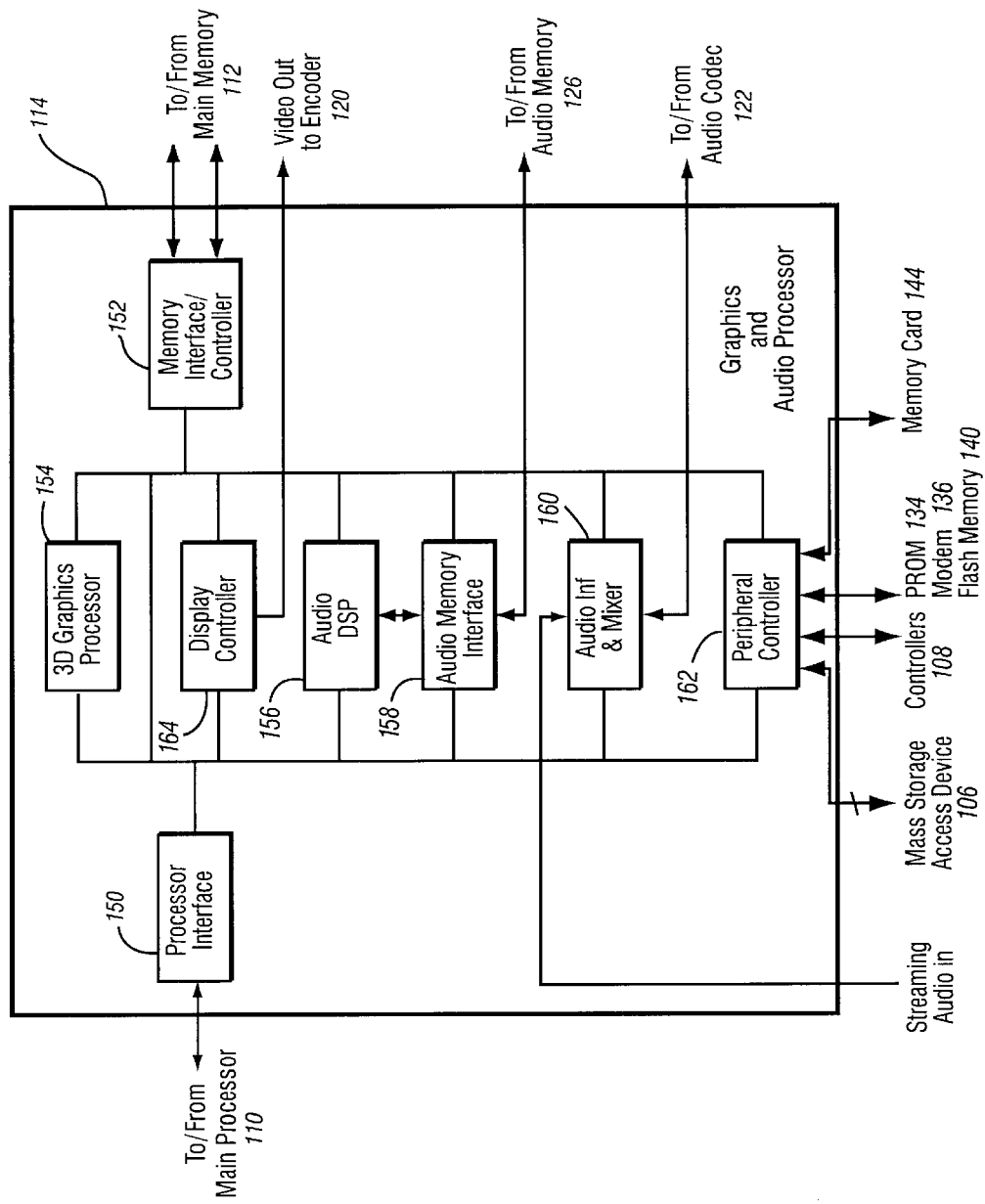
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

a processor interface 150, a memory interface/controller 152, a 3D graphics processor 154, an audio digital signal processor (DSP) 156, an audio memory interface 158, an audio interface and mixer 160, a peripheral controller 162, and a display controller 164.

3D graphics processor 154 performs graphics processing tasks. Audio digital signal processor 156 performs audio processing tasks. Display controller 164 accesses image information from main memory 112 and provides it to video encoder 120 for display on display device 102. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
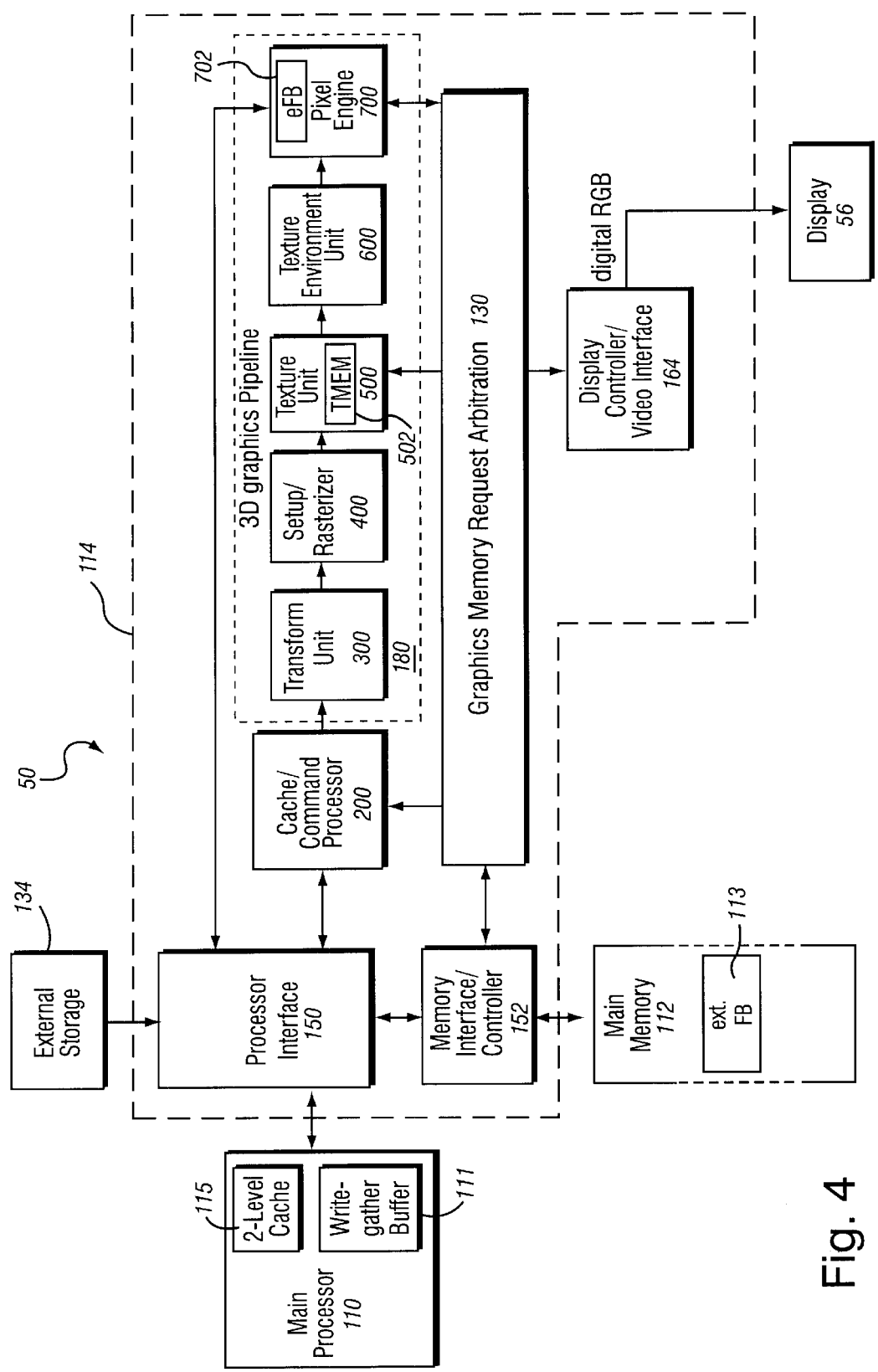
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 112 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands in binary format from main processor 110 and parses and decodes them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 102.

Figure 5:
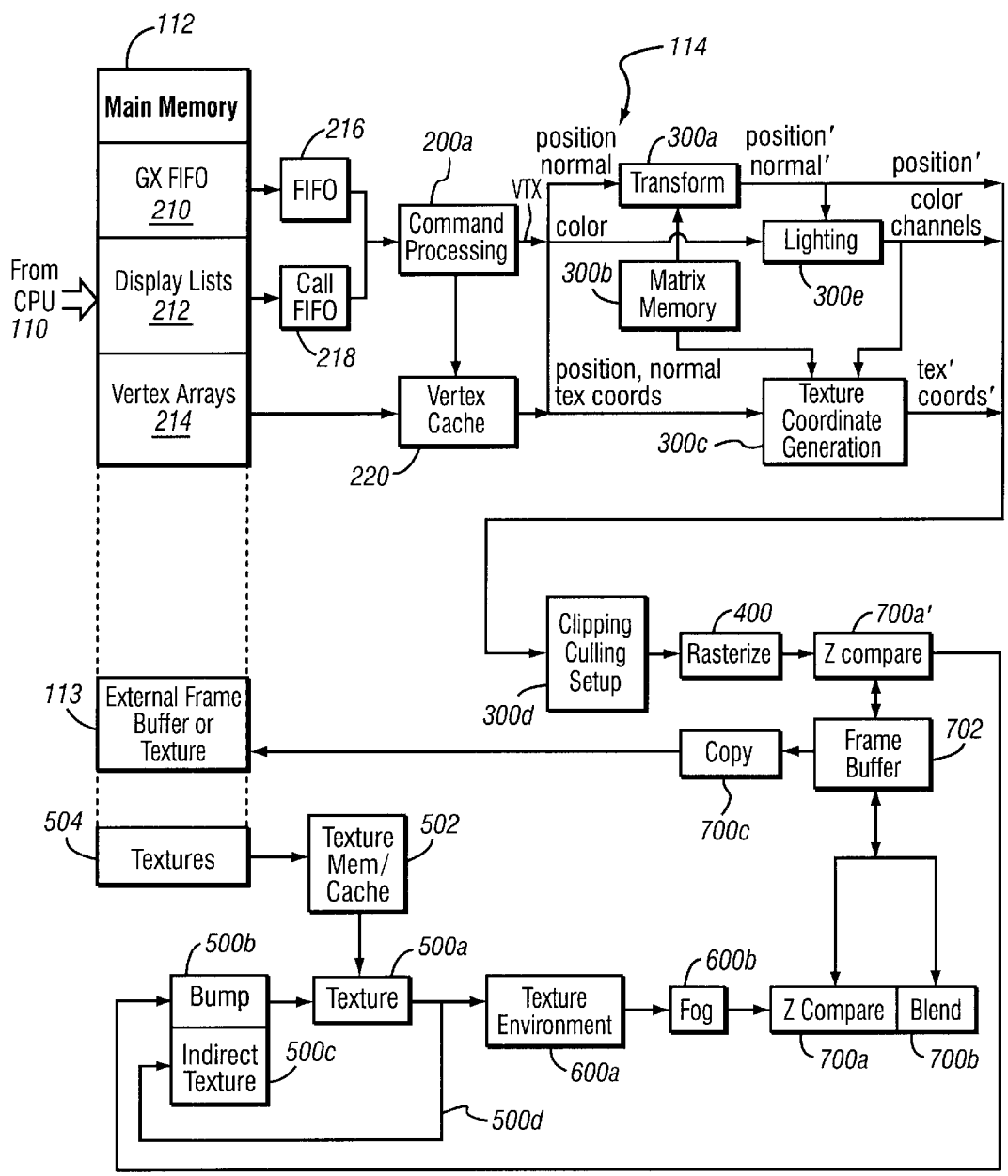
FIG. 5 is an example logical flow diagram of the FIG. 4 3D graphics processor.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110 or elsewhere. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 1000 in main memory 112 via a vertex cache 220.

Command processor 200 performs command processing operations 200a that convert attribute types to floating point format, and passes the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:
- a transform unit 300,
- a setup/rasterizer 400,
- a texture unit 500,
- a texture environment unit 600, and
- a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:

retrieving textures 504 from main memory 112, texture processing (500a) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500b), and indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a' can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Example Graphics System Application Interface

As described above, main processor 110 sends graphics commands to graphics and audio processor 114. These graphics commands tell the graphics and audio processor 114 what to do. For example, the graphics commands can tell the graphics and audio processor 114 to draw a particular image onto display device 56. Commands might also tell the graphics and audio processor 114 to produce a particular sound for output by loudspeakers 61. Still other commands might tell the graphics and audio processor 114 to perform so-called "housekeeping" commands and/or to set up a particular state in preparation for a subsequent "action" command.

In the example embodiment, the commands that main processor 110 sends to graphics and audio processor 114 can come from a number of sources. One source of commands is the main processor 110 itself. Under control of program instructions provided, for example, by mass storage access device 106 and/or boot ROM 134, main processor 110 can dynamically create or generate graphics commands under program control to send to graphics and audio processor 114. Main processor 110 can create and send graphics and audio processor 114 any command that the graphics and audio processor understands. Graphics and audio processor 114 will act on the commands and perform the action requested by the command.

Another source of graphics commands for graphics and audio processor 114 is mass storage access device 106. It takes some time for main processor 110 to dynamically create graphics commands. When system 50 is animating a scene in response to real-time inputs from hand controllers 52 or the like, there may be no alternative other than for main processor 110 to dynamically create the graphics commands telling the graphics and audio processor 114 to draw a particular cartoon or other character in a particular position. That way, as the user operates hand controllers 52 of system 50 responds to other input devices, main processor 110 can dynamically adjust or animate the displayed scene in response to those real-time inputs to provide interactive animation. Such fun and exciting interactive animation is generally provided by main processor 110 dynamically creating graphics commands "on the fly."

Sometimes, however, some part of a scene to be displayed is relatively static and does not change in response to real-time inputs. For example, a complicated 3D world background such as a castle, a mountain fortress, a landscape or an undersea world may not change much or at all as animated characters move through the world. In such cases, it is possible to use an offline authoring computer to develop the complex series of graphics commands required to draw the particular scene or portion of the scene and store them in a preconstructed is display list. Similarly, sound effects, music and other sounds can be pre-generated off-line by a sound authoring system. The resulting display list(s) and/or audio list(s) can be stored on an optical disk 62 or other mass storage device. When it comes time to draw the scene and/or play the sound, the associated display list(s) and/or audio list(s) can simply be read from the mass storage device 62 and stored into main memory 112. Main processor 110 may then, under program control, tell the graphics and audio processor 114 where to find the preconstructed display list(s) and/or audio list(s), and instruct the graphics and audio processor to execute the lists. In this way, main processor 110 does not have to devote its processing resources to develop complicated display lists and/or audio lists since that task is off-loaded to an off-line authoring system that pre-compiles the lists in preparation for use by the graphics and audio processor 114. Such display lists can be stored by any storage device within system 50 or accessible to it, including but not limited to memory card 144, flash memory 140, boot ROM 134, audio memory 126, etc. The commands could be embedded in hardware such as gate arrays or the like, and communicated to system 50 via any of the external interfaces such as bus 142, bus 132, handheld controller ports, parallel bus 130, infrared, etc.

Still another possibility is for commands intended for processing by the graphics and audio processor 114 to arrive via a data communications connection such as network 138. In one example, graphics commands, audio commands and/or other commands intended to be processed by graphics and audio processor 114 may arrive from a data communications network 138 via modem 136. Such commands could be transmitted, for example, from a remote system 50 of the same configuration as that shown in FIG. 2 in order to provide interactive multi-user remote game play. The commands could originate from any other source including a personal computer, a mini-computer or main frame computer, a data transmitter, or any other data source.

Irrespective of how commands intended for graphics and audio processor 114 arrive and how they are stored before and/or after arrival, the first step in causing such commands to be processed by the graphics and audio processor 114 is to make them available to the graphics and audio processor. In the example embodiment, making the commands available to graphics and audio processor 114 can be accomplished either by having main processor 10 send the commands directly to the graphics and audio processor via a data bus in an immediate mode of command transfer, or by storing the commands in some memory accessible to the graphics and audio processor 114 (e.g., main memory 112, audio memory 126, or any other memory device to which the graphics and audio processor 114 is coupled) and informing the graphics and audio processor where to find the commands and instructing it to begin processing those commands.

Graphics Command Stream

In the example embodiment, graphics and audio processor 114 may receive register and other commands from main processor 110 and/or some other source (e.g., main memory 112) in the form of a graphics command stream. Generally, the data that is sent from main processor 110 to the graphics and audio processor 114 can be called the "command stream." The command stream holds drawing commands along with vertices and their attributes and mechanisms for loading registers and changing modes in the graphics pipeline 180. The stream of graphics commands are sent to the graphics and audio processor 114 for processing in a generally sequential manner. Such stream commands can be provided in a so-called "immediate mode" directly from main processor 110 to the graphics and audio processor 114 through a write gatherer arrangement (see FIG. 4) to provide very efficient transfer of graphics and audio commands from the main processor 110 to the graphics and audio processor 114. The graphics command stream can also be provided to graphics and audio processor 114 via main memory 112 or other memory or other data communications capabilities within system 50. The cache/command processor 200 within the graphics and audio processor 114 performs tasks such as, for example, fetching the command stream from main memory 112; fetching vertex attributes (e.g., either from the command stream or from arrays in main memory); converting attribute types to appropriate formats (e.g., floating point); and transferring complete vertices to the remainder of the graphics pipeline 180 for processing.

As shown in FIG. 5, the command stream is fetched from the first-in-first-out buffer 210 (see also above-referenced Provisional Application No. 60/226,912, filed Aug. 23, 2000 and its corresponding utility application No. 09/726,215, filed Nov. 28, 2000 (atty. dkt. no. 723-959), both entitled "Method and Apparatus for Buffering Graphics Data in a Graphics System", and read into a FIFO buffer 216. The command processor 200 strips and decodes the commands to decide the number of data associated with it. The data is then taken from the stream and/or fetched from an array in main memory 112, based on an index value. The vertex attributes are converted to floating, point data that can be consumed by the transform engine 300.

The following, are example command stream formats in the example embodiment:

TABLE I

| Opcode | Opcode(7:0) | Next | Followed by |
|---|---|---|---|
| NOP | 00000000 | none | none |
| Draw_Quads | 10000vat(2:0) | VertexCount(15:0) | Vertex attribute stream |
| Draw_Triangles | 10010vat(2:0) | VertexCount(15:0) | Vertex attribute stream |
| Draw_Triangle_strip | 10011vat(2:0) | VertexCount(15:0) | Vertex attribute stream |
| Draw_Triangle_fan | 10100vat(2:0) | VertexCount(15:0) | Vertex attribute stream |
| Draw_Lines | 10101vat(2:0) | VertexCount(15:0) | Vertex attribute stream |
| Draw_Line_strip | 10110vat(2:0) | VertexCount(15:0) | Vertex attribute stream |
| Draw_Points | 10111vat(2:0) | VertexCount(15:0) | Vertex attribute stream |
| CP_LoadRegs (for CP only registers) | 00001xxx | Address[7:0] | 32 bits data |
| XF_LoadRegs (This is used for loading all XF registers, including matrices. It can be used to load matrices with immediate data) | 00010xxx | none | (N+2)*32 bits<br>First 32 bit:<br>  15:00 register address in XF<br>  19:16 number of 32 bit registers to be loaded (N+1, 0 means 1, 0xff means 16)<br>  31:20 unused<br>Next N+1 32 bits:<br>  31:00 register data |
| XF_IndexLoadRegA (registers are in the first 4K address space of the XF. It can be used to block load matrix and light registers) | 00100xxx | none | 32 bits<br>11:0 register address in XF<br>15:12 number of 32 bit data, (0 means 1, 0xff means 16)<br>31:16 Index to the register Array A |
| XF_IndexLoadRegB (registers are in the first 4K address space of the XF. It can be used to block load matrix and light registers) | 00101xxx | none | 32 bits<br>11:0 register address in XF<br>15:12 number of 32 bit data, (0 means 1, 0xff means 16)<br>31:16 Index to the register Array B |
| XF_IndexLoadRegC (registers are in the first 4K address space of the XF. It can be used to block load matrix and light registers) | 00110xxx | none | 32 bits<br>11:0 register address in XF<br>15:12 number of 32 bit data. (0 means 1, 0xff means 16)<br>31:16 Index to the register Array C |
| XF_IndexLoadRegD (registers are in the first 4K address space of the XF. It can be used to block load matrix and light registers) | 00111xxx | none | 32 bits<br>11:0 register address in XF<br>15:12 number of 32 bit data, (0 means 1, 0xff means 16)<br>31:16 Index to the register Array D |
| Call_Object | 01000xxx | none | 2x32<br>25:5 address (need to be 32 byte align)<br>25:5 count (32 byte count) |
| V$ Invalidate | 01001xxx | none | none |
| SU_ByPassCmd (This includes all the register load below XF and all setup unit commands, which bypass XF) | 0110,SUattr(3:0) | none | 32 bit data |

As shown in Table I above, the graphics command stream can include register load commands. Register commands are, in general, commands that have the effect of writing particular state information to particular registers internal to the graphics and audio processor 114. The graphics and audio processor 114 has a number of internal registers addressable by main processor 110. To change the state of the graphics and audio processor 114 in particular way, main processor can write a particular value to a particular register internal to the graphics and audio processor 114. Register load commands have the advantage of allowing the graphics pipeline to retain drawing state information that main processor 110 can selectively change by sending further register load commands.

For example, the vertices in a draw command can all share the same vertex attribute data structure defining a number of attributes associated with a vertex. Sending all of the vertex attribute information before a draw command could be costly. It therefore may be desirable to store most of the common vertex types in registers within the graphics and audio processor 114, and to simply pass an index to the stored table. These tables may not need to be updated each time a new draw command is sent down, but may only need to be updated every once in a while. In the example embodiment, command processor 200 holds a vertex command descriptor register (VCD) and a eight-entry vertex attribute table (VAT) defining whether the attribute is present and if so whether it is indexed or direct. A "load_VCD" register command is used to update the register whenever updating is necessary.

In certain situations, main processor 110 may also read the graphics and audio processor 114 internal registers to determine the state of the graphics and audio processor. For example, the main processor 110 can start and stop the graphics and audio processor 114 and/or determine its general status by reading from and/or writing to internal registers within the graphics and audio processor. Main processor 110 can also load a number of graphics values (e.g., transformation matrices, pixel formats, vertex formats, etc.) by writing to registers within the graphics and audio processor 114. As another example, main processor 110 can write to a series of FIFO control registers within the graphics and audio processor 114 that control where the graphics and audio processor 114 obtains further commands for processing.

The following are example command registers used for defining transformation matrices, vertex control data, vertex attribute tables, vertex arrays, vertex stride, and other state parameters:

TABLE II

| Register name | Register address[7:0] | Bit fields |
| --- | --- | --- |
| MatrixIndexA | 0011xxxx | 5:0 index for position/normal matrix<br>11:6 index for tex0 matrix<br>17:12 index for tex1 matrix<br>23:18 index for tex2 matrix<br>29:24 index for tex3 matrix |
| MatrixIndexB | 0100xxxx | 5:0 index for tex4 matrix<br>11:6 index for tex5 matrix<br>17:12 index for tex6 matrix<br>23:18 index for tex7 matrix |
| VCD_Lo | 0101xxxx | 16:00 VCD 12 to 0<br>0 PosMatIdx<br>1 Tex0MatIdx<br>2 Tex1MatIdx<br>3 Tex2atIdx<br>4 Tex3MatIdx<br>5 Tex4MatIdx<br>6 Tex5MatIdx<br>7 Tex6MatIdx<br>8 Tex7MatIdx<br>10:9 Position<br>12:11 Normal<br>14:13 ColorDiffused<br>16:15 ColorSpecular |
| VCD_-Hi | 0110xxxx | 15:00 VCD 20 to 13<br>01:00 Tex0Coord<br>03:02 Tex1Coord<br>05:04 Tex2Coord<br>07:06 Tex3Coord<br>09:08 Tex4Coord<br>11:10 Tex5Coord<br>13:12 Tex6Coord<br>15:14 Tex7Coord |
| VAT_group0 | 0111x,vat[2:0] | 32 bits<br>08:00 Position parameters<br>12:09 Normal parameters<br>16:13 ColorDiffused parameters<br>20:17 ColorSpecular parameters |

TABLE II-continued

| Register name | Register address[7:0] | Bit fields |
| --- | --- | --- |
| VAT_group1 | 1000x,vat[2:0] | 29:21 Tex0Coord parameters<br>30:30 ByteDequant<br>31:31 NormalIndex3<br>32 bits<br>08:00 Tex1Coord parameters<br>17:09 Tex2Coord parameters<br>26:18 Tex3Coord parameters<br>30:27 Tex4Coord parameters sub-field[3:0]<br>31unused |
| VAT_group2 | 1001x,vat[2:0] | 32 bits<br>04:00 Tex4Coord parameters sub-field[8:4]<br>13:05 Tex5Coord parameters<br>22:14 Tex6Coord parameters<br>31:23 Tex7Coord parameters |
| ArrayBase | 1010,array[3.0]<br>array[3.0]:<br>0000 = attribute9 base register<br>0001 = attribute10 base register<br>0010 = attribute11 base register<br>0011 = attribute12 base register<br>0100 = attribute13 base register<br>0101 = attribute14 base register<br>0110 = attribute15 base register<br>0111 = attribute16 base register<br>1000 = attribute17 base register<br>1001 = attribute18 base register<br>1010 = attribute19 base register<br>1011 = artribute20 base register<br>1100 = IndexRegA base register<br>1101 = IndexRegB base register<br>1110 = IndexRegC base register<br>1111 = IndexRegD base register | 32 bit data<br>25:00 Base(25:0)<br>31:26 unused |
| ArrayStride | 1011,array[3:0]<br>array[3:0]:<br>0000 = attribute9 stride register<br>0001 = attribute10 stride register<br>0010 = attribute11 stride register<br>0011 = attribute12 stride register<br>0100 = attribute13 stride register<br>0101 = attribute14 stride register<br>0110 = attribute15 stride register<br>0111 = attribute16 stride register<br>1000 = attribute17 stride register<br>1001 = attribute18 stride register<br>1010 = attribute19 stride register<br>1011 = attribute20 stride register | 32 bit data<br>07:00 Stride(7:0)<br>31:08 unused |

TABLE II-continued

| Register name | Register address[7:0] | Bit fields |
|---|---|---|
| | 1100 = IndexRegA stride register | |
| | 1101 = IndexRegB stride register | |
| | 1110 = IndexRegC stride register | |
| | 1111 = IndexRegD stride register | |

In the example embodiment, the command processor 200 converts the command stream to a vertex stream which it sends to transform unit 300 for further processing. The vertex stream sent to the transform unit 300 can change based on the current mode, but the data ordering per vertex is essentially the same and is fixed as shown in the following table:

TABLE III

| Location in stream (in words) | Data | Description |
|---|---|---|
| 0 to 2 | X, Y, Z in 32b SPFP | Geometry information in single precision floating point format |
| 3 to 5 | Nx, Ny, Nz in 32b SPFP | Normal vector |
| 6 | RGBA in 32b integer (8b/comp) | Color0 per vertex (RGBA) |
| 7 | RGBA in 32b integer (8b/comp) | Color1 per vertex (RGBA) |
| 8 to 10 | Tx, Ty, Tz in 32b SPFP | Binormal vector T |
| 11 to 13 | Bx, By, Bz in 32b SPFP | Binormal vector B |
| 14 to 15 | S0, T0 in 32b SPFP | Texture 0 data |
| 16 to 29 | Sn, Tn in 32b SPFP | Texture 1 to n data |

The location of words in the stream is order dependent, but not exact. For example, if the per-vertex color is not supplied, then the first texture will start at word 6 instead of word 8. Texture comes after color.

Example Graphics Application Processing Loop

Figure 6:
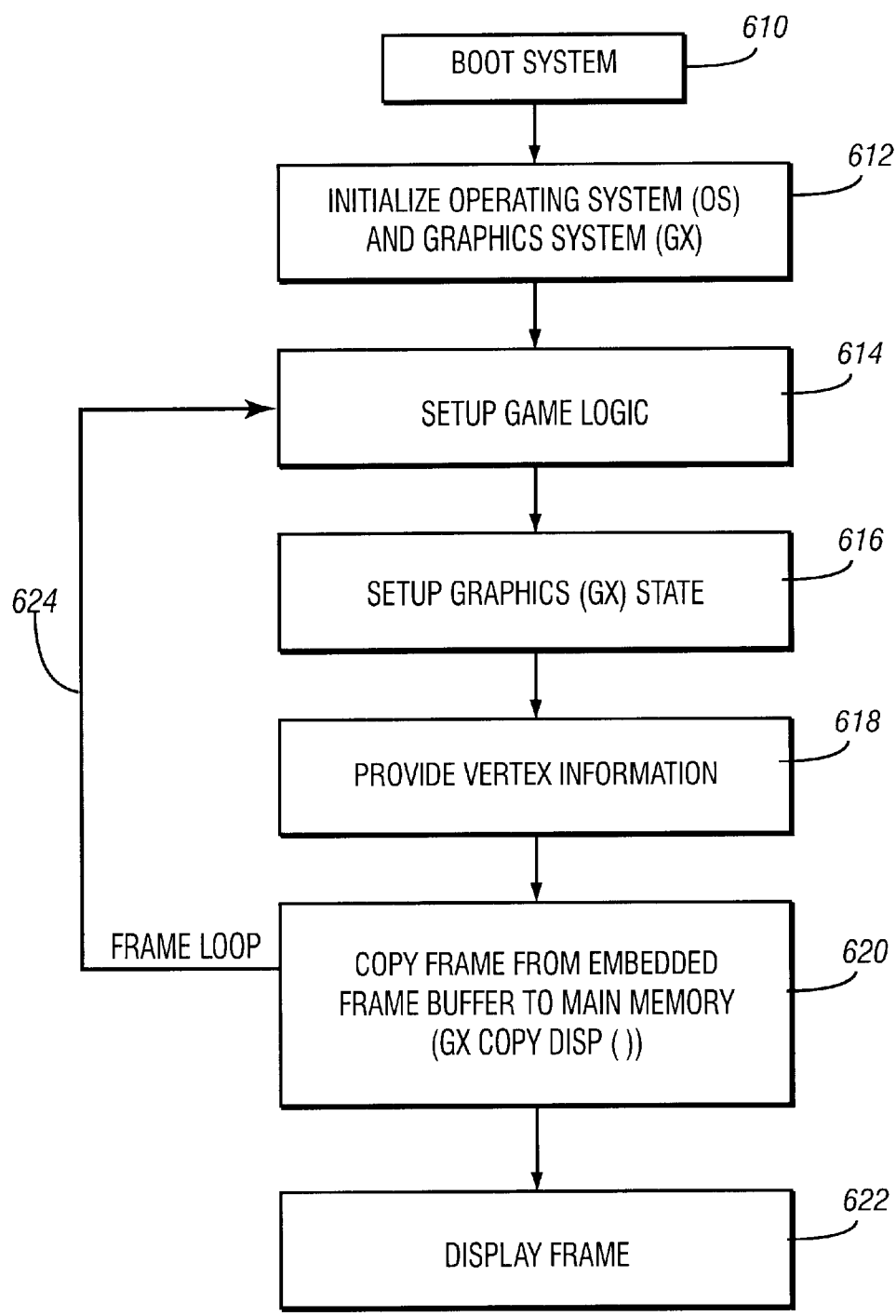
FIG. 6 is a general flow chart of functions performed by an example application for the FIG. 1 graphics system.
Figure 7:
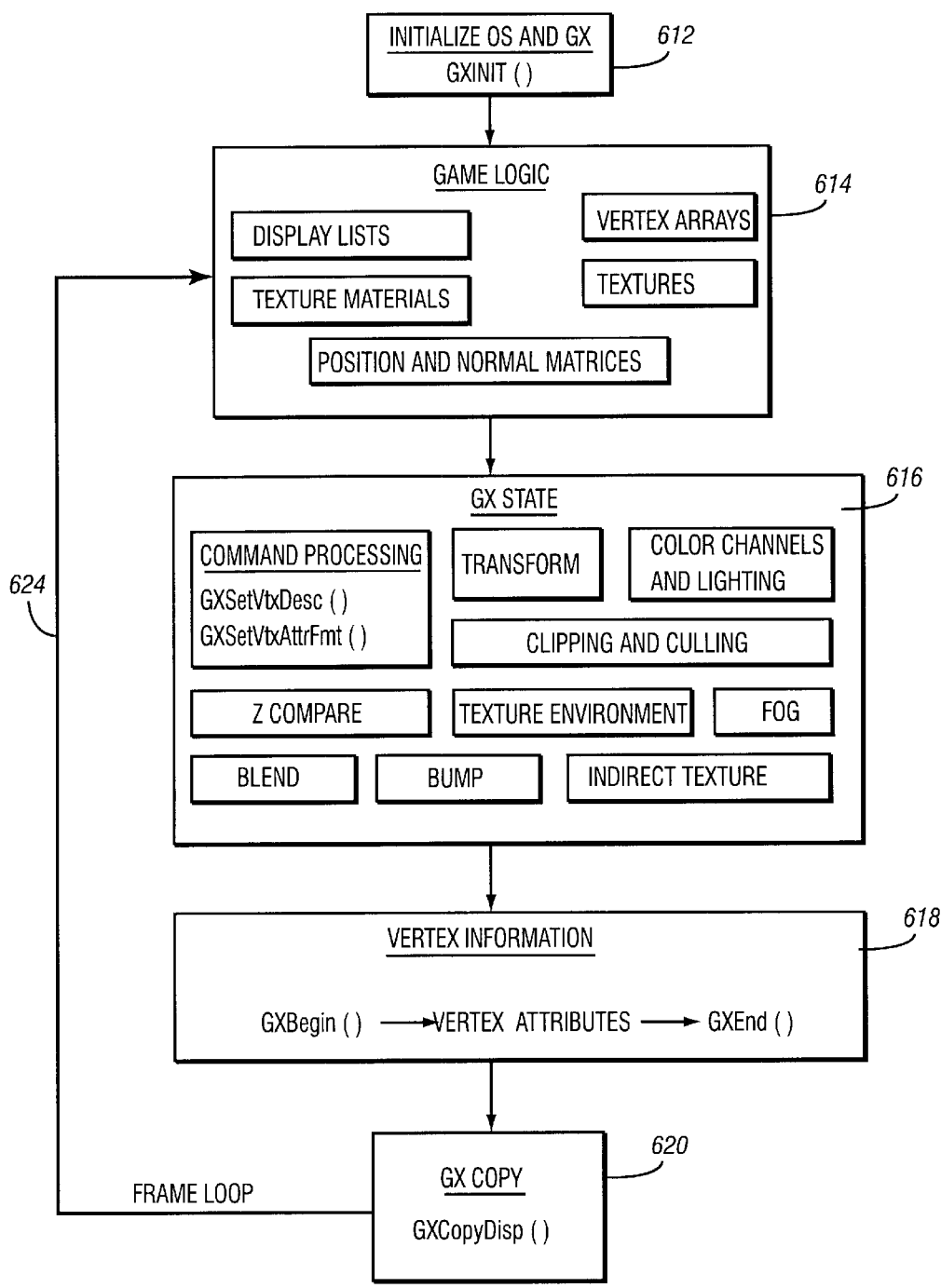
FIG. 7 is a flow chart showing the functions of FIG. 6 in more detail.

FIG. 6 shows an example summary flow chart of steps that may be performed by system 50 under control of an application such as a video game program to develop graphics for display on the display 56. System 50 is first booted from boot ROM 134 (block 610). During or after system boot, main processor 110 and graphics and audio processor 114 are initialized and the operating system is also initialized (block 612). System 50 is then ready to have its logic set up for a specific application, such as a videogame (block 614). The state of the graphics and audio processor 114 is set by sending an appropriate graphics command stream to the graphics and audio processor (block 616). The system 50 is then ready to process vertex information provided through a further command stream describing a primitive in terms of vertex data structure, and draw commands (block 618). Once the embedded frame buffer 702 has a completed frame of data, further commands sent to the graphics and audio processor 114 cause the processor to copy its embedded frame buffer to an external frame buffer 113 allocated in main memory 112 (block 620). The video interface 164 is then used to display the image data in the external frame buffer on a display device (block 622). Once a completed frame is copied from the embedded frame buffer, the system is ready to begin processing the next frame, as indicated by the frame loop 624 in FIG. 6. FIG. 7 shows is greater detail some of the possible graphics commands that can be performed in connection with each of the various steps shown in FIG. 6.

Example Simple Graphics Command Stream

Figure 8:
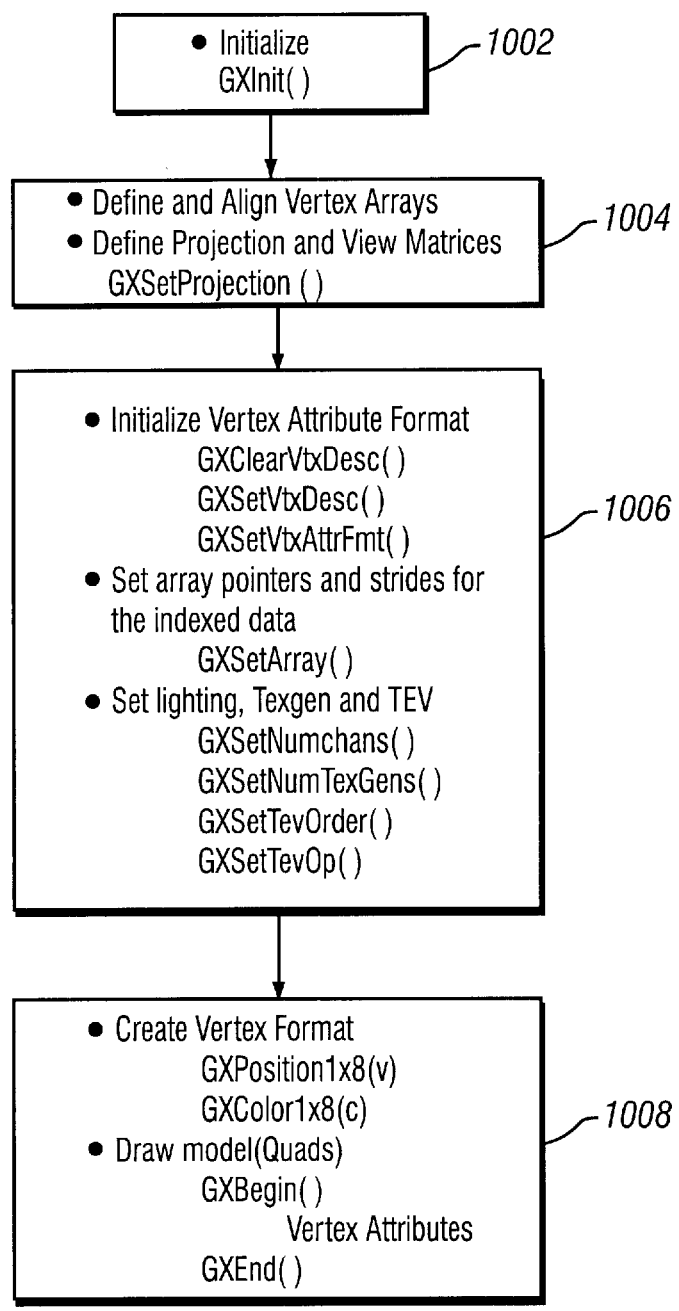
FIG. 8 shows example simple graphics command stream.

For purposes of illustration FIG. 8 shows an example simple graphics command stream drawing a single graphics primitive (e.g., a single triangle) on display 56. In this example simple graphics command stream, the first set of graphics commands initializes the graphics pipeline 180 (GXInit( )) (block 1002). When the graphics and audio processor 114 comes out of hardware reset, its internal register values are undefined and therefore need to be set by main processor 110 under control of boot ROM 134 and/or the application program. A series of initialization commands such as register load commands may be issued to set the state of graphics and audio processor 114 to a known, pre-defined state that is suitable for the particular application that is to be performed. Of course, the application can reset any of these values to any other desired value on a dynamic basis. However, to save the application work, it may be desirable for boot ROM 134 to provide a series of state-setting graphics initialization commands that set up the graphics and audio processor 114 so that it is operating in a known functioning default graphics mode.

Figure 9:
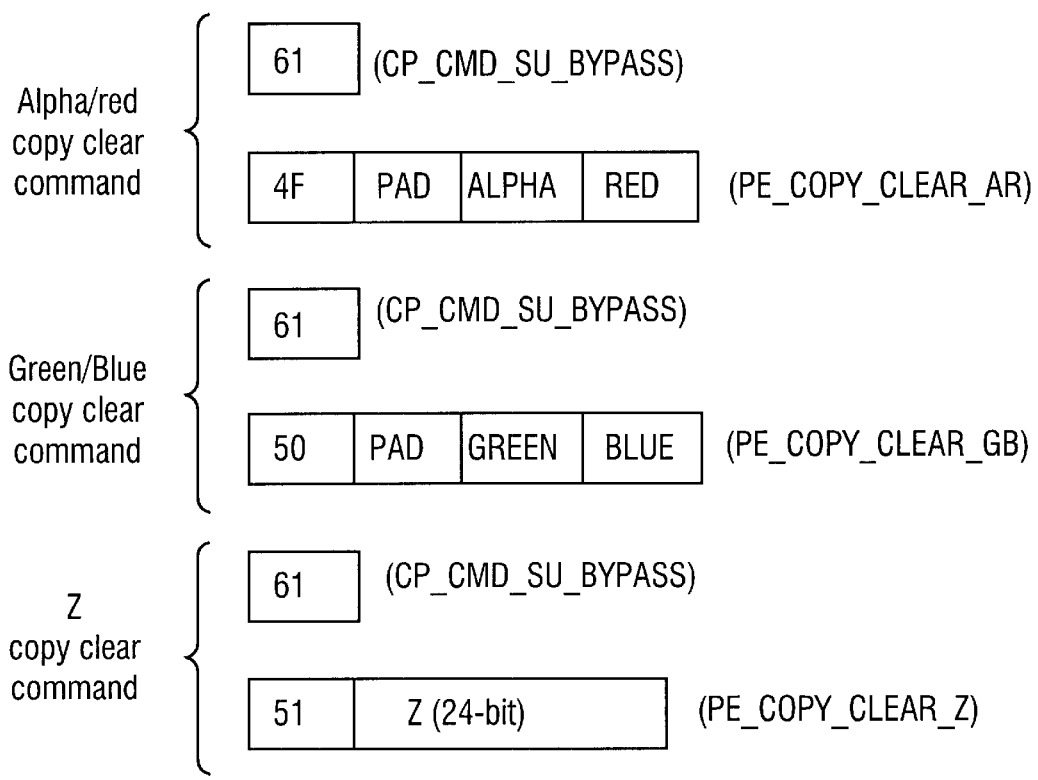
FIG. 9 shows an example binary level interface for setting the embedded color and depth buffer of the FIG. 1 system to a particular (e.g., initial) value.

One example initialization may be to clear (set) the internal embedded frame buffer 702 to an all-black color value with z (distance) of the corresponding embedded depth buffer being set to infinite distance at each location. Such a "set copy clear" instruction effectively sets up a clean canvas onto which graphics and audio processor 114 can draw the next image, and is re-formed during an embedded frame buffer copy operation in the example embodiment. FIG. 9 shows an example binary data stream that may be sent to the graphics and audio processor 114 to control it to clear (set) its internal frame buffer 113 to a black color at each and every pixel location and to set the corresponding internal depth buffer to infinite distance at every pixel. In the particular example shown, such a command stream comprises three pixel engine register load commands:

pixel engine copy clear (alpha red),
pixel engine copy clear (green blue),
pixel engine copy clear (z).

In this example, the first portion of each register load command includes a "cp_cmd_su_bypass" command string (0x61) (where "0x" indicates hexadecimal). As explained in Table I above, this command string provides access to registers within graphics pipeline 180 below transform unit 300. This string is followed by a pixel engine register designation (0x4F in the case of a pixel engine copy clear alpha/red command), a 1-byte pad; and a 1-byte alpha value and a 1-byte red value (FF for black).

A similar format is used for the pe_copy_clear_green blue command except that the last two bytes indicate the green and blue values (FF for black), and a different pixel engine register designation (0x50) is used for the green/blue register values. Similarly, the pe_copy_clear_z command is issued by sending a cp_cmd_su_bypass string (0x61) followed by a register designator 0x51 (designating a pixel engine z value register) followed by a 24-bit z (depth) value. The three set copy clear commands shown n FIG. 9 could be issued in any order (e.g., set z copy clear or set green/blue copy clear could be issued first). See FIG. 9A which shows example register formats.

In response to receipt of the FIG. 9 commands, pixel engine 700 writes the specified alpha, red, green, blue and z values into embedded frame buffer 702.

Referring once again to FIG. 8, a next step in preparing to display an image onto display 56 may be to define the various data structures associated with the vertices of the primitive to be drawn. The FIG. 10 diagram shows, for purposes of illustration, example vertex and vertex attribute descriptors that can be used to describe vertices. In the example embodiment, all vertices within a given primitive share the same vertex descriptor and vertex attribute format. The vertex descriptor in the example embodiment describes which attributes are present in a particular vertex format and how they are transmitted from the main processor 110 (or other source) to the graphics processor 114 (e.g., either direct or indexed). The vertex attribute format describes the format (e.g., type, size, format, fixed point scale, etc.) of each attribute in a particular vertex format. The vertex attribute format together with the vertex descriptor may be thought of as the overall vertex format.

The following is an example of a vertex attribute table (VAT) (see also above-referenced application Ser. No. 09/465,754 filed Dec. 17, 1999 entitled "Vertex Cache For 3D Computer Graphics") indexed by a draw command "vat" field, with each entry in the table specifying characteristics for all of the thirteen attributes:

TABLE IV

VERTEX ATTRIBUTE TABLE (VAT)

| Attribute number | Attribute name | bits | Encoding | |
|---|---|---|---|---|
| 0 | PosMatIdx | 0 | Position/normal matrix index. Always direct if present<br>0: not present   1: present<br>NOTE: position and normal matrices are stored in 2 separate RAMs in the Xform unit, but there is a one to one correspondence between normal and position index. If index "A" is used for the position, then index "A" needs to be used for the normal as well. | |
| 1 | Tex0MatIdx | 1 | TextCoord0 matrix index, always direct if present<br>0: not present   1: present | |
| 2 | Tex1MatIdx | 2 | TextCoord0 matrix index, always direct if present<br>0: not present   1: present | |
| 3 | Tex2MatIdx | 3 | TextCoord0 matrix index, always direct if present<br>0: not present   1: present | |
| 4 | Tex3MatIdx | 4 | TextCoord0 matrix index, always direct if present<br>0: not present   1: present | |
| 5 | Tex4MatIdx | 5 | TextCoord0 matrix index, always direct if present<br>0: not present   1: present | |
| 6 | Tex5MatIdx | 6 | TextCoord0 matrix index, always direct if present<br>0: not present   1: present | |
| 7 | Tex6MatIdx | 7 | TextCoord0 matrix index, always direct if present<br>0: not present   1: present | |
| 8 | Tex7MatIdx | 8 | TextCoord0 matrix index, always direct if present<br>0: not present   1: present | |
| 9 | Position | 10:9 | 00: reserved<br>01: direct | 10: 8 bit index<br>11: 16 bit index |
| 10 | Normal | 12:11 | 00: not present<br>01: direct | 10: 8 bit index<br>11: 16 bit index |
| 11 | Color0 | 14:13 | 00: not present<br>01: direct | 10: 8 bit index<br>11: 16 bit index |
| 12 | Color1 | 16:15 | 00: not present<br>01: direct | 10: 8 bit index<br>11: 16 bit index |
| 13 | Tex0Coord | 18:17 | 00: not present<br>01: direct<br>10: 8 bit index<br>11: 16 bit index | |

TABLE IV-continued

VERTEX ATTRIBUTE TABLE (VAT)

| Attribute number | Attribute name | bits | Encoding |
|---|---|---|---|
| 14 | Tex1Coord | 20:19 | 00: not present<br>01: direct<br>10: 8 bit index<br>11: 16 bit index |
| 15 | Tex2Coord | 22:21 | 00: not present<br>01: direct<br>10: 8 bit index<br>11: 16 bit index |
| 16 | Tex3Coord | 24:23 | 00: not present<br>01: direct<br>10: 8 bit index<br>11: 16 bit index |
| 17 | Tex4Coord | 26:25 | 00: not present<br>01: direct<br>10: 8 bit index<br>11: 16 bit index |
| 18 | Tex5Coord | 28:27 | Same as above |
| 19 | Tex6Coord | 30:29 | 00: not present<br>01: direct<br>10: 8 bit index<br>11: 16 bit index |
| 20 | Tex7Coord | 32:31 | 00: not present<br>01: direct<br>10: 8 bit index<br>11: 16 bit index |

As described in application Ser. No. 09/465,754, as well as above, entries in the vertex descriptor information can be either direct or indexed. Indexed vertex attributes include an index to an array instead of a value. The index may be an 8-bit or 16-bit pointer into an array of attributes. In the example embodiment, there is one base address register per attribute in the command processor 200. The index is not simply an offset into the array, but rather depends on a number of factors including, for example, the number of components in the attribute; the size of the component; padding between attributes for alignment purposes; and whether multiple attributes are interleaved in the same array. To provide maximum flexibility, there is also an array stride register for each attribute. The distance between two attributes (computed by software) is loaded into this register. Calculations are used to calculate the offset and to calculate the actual memory address based on an index value. An example address calculation is as follows:

$$\text{Memory address} = \text{ArrayBase}[I] + \text{index} * \text{ArrayStride}[I],$$

where I is the attribute number. In one particular implementation, the ArrayBase value is a 26-bit byte address, and ArrayStride is an 8-bit value.

A vertex can have direct and indirect attributes intermixed. For short values, it may be more efficient to send the actual value than a pointer to the value.

Any attribute in the example embodiment can be sent directly or as in index into an array.

In general, the steps required to draw a primitive include describing which attributes are present in the vertex format (i.e., define the vertex attribute table); describing whether the attributes are indexed or referenced directly (i.e., define the vertex descriptor); for indexed data, delivering a vertex array that can be referenced by array pointers and strides; describing the number of elements in each attribute and their type; describing the primitive type; and then, finally, drawing the primitive by sending the graphics processor 114 draw command with a stream of vertices that match the vertex description in attribute format (see FIG. 8, blocks 1004, 1006, 1008).

FIG. 11 shows an example "set array" command used to help define a vertex format (see FIG. 8 block 1004, "Define and Align Vertex Arrays"). In the example embodiment, the example "set array" command sets the command processor array base register for a particular vertex array and also sets the array stride register for the array. FIG. 11 shows particular example binary bit patterns that may be used for this command. In this example, to set an array base register, the graphics command stream may include:

- an initial "0x08" value indicating "cp_cmd_load reg" (i.e., load a command processor 200 register) followed by
- a 2-byte value indicating which array base register is to be loaded, followed by
- an additional 4-byte value providing an address to the array in memory.

In this particular example, the 2-byte value indicating which array base register is to be loaded has the format "0xAx", where the byte "x" following the "A" value encodes a particular one of the attributes set forth in Table IV above. Note that some of the Table IV attributes (i.e., the matrix indices) are not included in the encoding in the example embodiment. In the example embodiment, the 4-byte address in memory is encoded by providing six initial bits of 0 padding followed by a 26-bit address. Setting the array stride register value is similar except that the third and fourth bytes indicate an array stride register (e.g., "0xBx" and the following value comprises four bytes containing an initial 24-bit 0 padded value and an 8-bit stride value for the array.

Referring once again to FIG. 8, a further step preliminary to issuing a draw command may be to set up a vertex descriptor and a vertex attribute table (block 1006). FIG. 12 shows an example command stream used to set a vertex descriptor. In the example embodiment, setting a vertex descriptor involves setting two associated register values ("vcd_lo" "vcd_hi") within command processor 200 in order to specify the particular vertex descriptor attributes associated with the primitive to be displayed. FIG. 12 shows particular binary encodings used to tell the graphics and audio processor 114 to load the vcd_lo and vcd_hi registers (e.g., "0x0850" for an example vcd_lo register and "0x0860" to specify loading a cp_vcd_hi register). Values following each of these 4-byte commands indicates particular vertex attribute values as shown in Table 4 above, and as encoded in the particular binary bit patterns slots shown in FIG. 12.

In more detail, the vertex descriptor stored in the VCD_lo VCD_hi register includes at least one bit for each of the twenty attributes shown in Table IV, that bit generally indicating whether the attribute is provided directly or via an array. In the example embodiment, the VCD_lo register contains a 17-bit value, providing bit flags indicating direct or indexed for each of the first twelve attributes in Table IV. The particular bit encodings are shown in the last column of Table IV. Note that certain attribute encodings indicate whether or not the attribute is present (since the attribute is always direct if it is present), and certain other encodings span multiple bits and provide information as to the type of index if the attribute is indexed (e.g., the "position" value may span two bits with a value "01" for direct, "10" for 8-bit index, and "11" for 16-bit index). Similarly, the VCD-hi register contains bit fields corresponding to attributes 13-20 (i.e., texture 0 coordinate through texture 7 coordinate) as shown in Table IV above.

On a more abstract level, the GXSetVtxDesc command is used to indicate whether an attribute is present in the vertex data, and whether it is indexed or direct. There is only one active vertex descriptor, known as the current vertex descriptor. A GXSetVtxDesc command can be used to set a value of GX_NONE for all the attributes in the current vertex descriptor to indicate that no data for this attribute will be present in the vertex. Once the VCD registers are cleared, the application only needs to describe attributes that it intends to provide. As shown in Table IV, possible attributes are:

Position, GX_VA_POS (this attribute is required for every vertex descriptor).
    Normal, GX_VA_NRM, or normal/binormal/tangent, GX_VA_NBT.
Color_0, GX_VA_CLR0.
Color_1, GX_VA_CLR1.
Up to 8 texture coordinates, GX_VA_TEX0_7.
A position/normal matrix index, GX_VA_PNMTXIDX.
A texture matrix index, GX_VA_TEX0MTXIDX-GX_VA_TEX7MTXIDX.

The last two attributes listed are 8-bit indices which are used for referencing a transformation matrix in the on-chip matrix memory. This supports simple skinning of a character, for example. These indices are different from the other attributes in that they may only be sent as direct data.

The graphics processor (GP) 114 assumes that the application will send any attribute data you have specified in the ascending order shown in Table IV, that is:

Order Attribute
0 GX_VA_PNMTXIDX
1 GX_VA_TEX0MTXIDX
2 GX_VA_TEX1MTXIDX
3 GX_VA_TEX2MTXIDX
4 GX_VA_TEX3MTXIDX
5 GX_VA_TEX4MTXIDX
6 GX_VA_TEX5MTXIDX
7 GX_VA_TEX6MTXIDX
8 GX_VA_TEX7MTXIDX
9 GX_VA_POS
  10 GX_VA_NRM or GX_VA_NBT
11 GX_VA_CLR0
12 GX_VA_CLR1
13 GX_VA_TEX0
14 GX_VA_TEX1
15 GX_VA_TEX2
16 GX_VA_TEX3
17 GX_VA_TEX4
18 GX_VA_TEX5
19 GX_VA_TEX6
20 GX_VA_TEX7

Texture coordinates are enabled sequentially, starting at GX_VA_TEX0.

Describing Attribute Data Formats

Figure 13A:
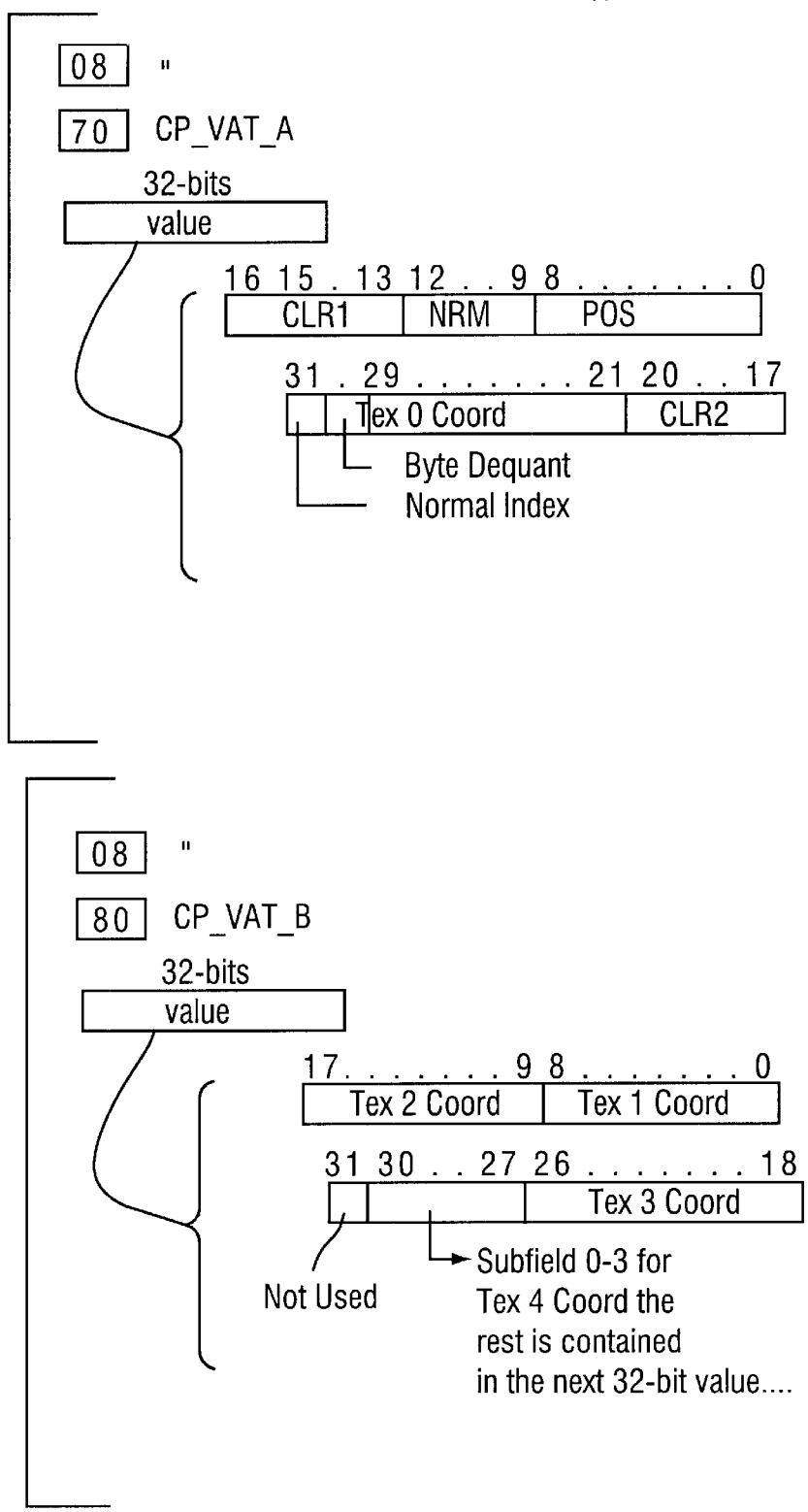
FIGS. 13A and 13B together show an example binary level interface defining a vertex attribute table.
Figure 13B:
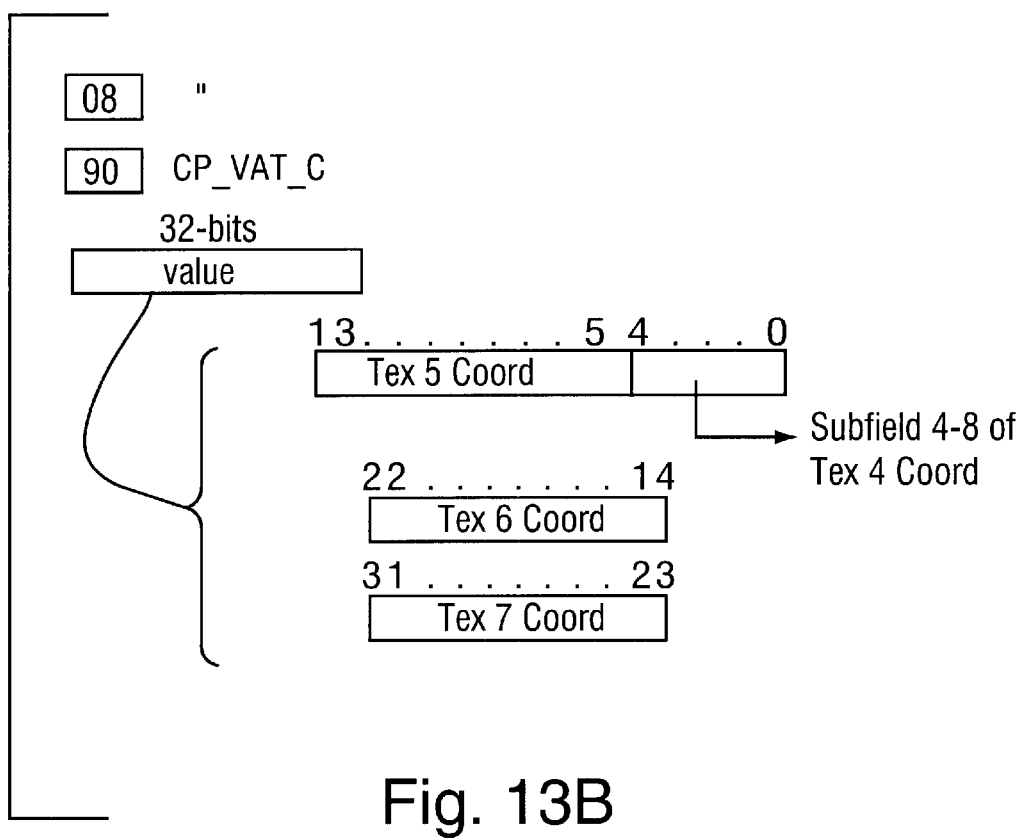

FIGS. 13A and 13B show an example command stream for setting vertex attribute formats. The Vertex Attribute Format Table (VAT) allows the application to specify the format of each attribute for up to eight different vertex formats. The VAT is organized as shown in FIG. 14. The application can store eight predefined vertex formats in the table. For each attribute in a vertex, the applicaiton can specify the following:

The number of elements for the attribute.
The format and size information.
The number of fractional bits for fixed-point formats using the scale parameter (the scale parameter is not relevant to color or floating-point data).

Example Vertex Attribute Format Command
(GXSetVtxAttrFmt)

```
//format index attribute n elements format n frac bits
GXSetVtxAttrFmt(GX_VTXFMT0, GX_VA_POS,
    GX_POS_XYZ, GX_S8, 0);
GXSetVtxAttrFmt(GX_VTXFMT0, GX_VA_CLR0,
    GX_CLR_RGBA, GX_RGBA8, 0);
```

The high-level code above defines vertex attribute format zero. GX_VTXFMT0 indicates that "position" is a 3-element coordinate (x, y, z) where each element is an 8-bit 2's complement signed number. The scale value indicates the number of fractional bits for a fixed-point number, so zero indicates that the data has no fractional bits. The second command specifies that the GX_VA_CLR0 attribute has four elements (r, g, b, a) where each element is 8 bits. The matrix index format is not specified in the table because it is always an unsigned 8-bit value. The scale value is implied for normals (scale=6 or scale=14) and not needed for colors. Also, normals are assumed to have three elements, Nx, Ny, Nz (for GX_VA_NRM), and nine elements, Nx, Ny, Nz, Bx, By, Bz, Tx, Ty, Tz (for GX_VA_NBT). Normals are generally always signed values. The normal format (GX_VA_NRM) is also used for binormals/tangents (GX_VA_NBT) when they are enabled in the current vertex descriptor. The VAT in the Graphics Processor has room for eight vertex formats. The application can describe most of its attribute quantization formats early in the application, loading this table as required. Then the application provides an index into this table, which specifies the vertex attribute data format, when it starts drawing a group of primitives. If the application requires more than eight vertex formats it must manage the VAT table by reloading new vertex formats as needed.

FIGS. 13A and 13B show example binary-level commands for controlling the graphics and audio processor 114 to load an example vertex attribute table (VAT). In the example embodiment, the VAT spins three separate register loads (VAT_A, VAT_B, VAT_C) so that setting a vertex attribute format involves writing values to three internal "VAT" registers within the graphics and audio processor 114, i.e.:

"0x0870" [4-byte value] to write to the cp_VAT_A register,

"0x880" [4-byte value] to write to the cp_VAT_B register, and

"0x0890" [4-byte value] to write to the cp_VAT_C register.

As shown in FIG. 13A, the binary bit field encoding for the VAT_A register write involves providing position, normal, color 1, color 2, texture 0 coordinate, and other information (i.e., byte dequantization and normal index bits) in the binary pattern slots shown. Similarly, the binary bit field encoding for the VAT B register write invovlves providing formatting information for texture coordinate 1, texture coordinate 2, texture coordinate 3 and part of texture coordinate 4; and the information to be stored in the VAT_C register provides attribute format information for the rest of texture coordinate 4, texture coordinate 5, texture coordinate 6 and texture coordinate 7. FIGS. 13A and 13B show the particular bit pattern encodings that may be used. Additional explanation of these particular attributes is set forth in Table V:

TABLE V

| Bit field | Attribute number | Attribute name | .CompCount sub-field(0) | .CompSize sub-field(3:1) | .Shift amount sub-field(8:4) |
|---|---|---|---|---|---|
| 8:0 | 9 | Position | 0: two (x,y)<br>1: three (x,y,z) | 0:ubyte 1:byte 2:ushort<br>3:short 4:float 5–7<br>reserved | Location of decimal point from LSB. This shift applies to all u/short components and to u/byte components where ByteDequant is asserted (Below). |
| 12:9 | 10 | Normal | 0: three normals<br>1: nine normals | 0:reserved 1:byte<br>2:reserved<br>3:short 4:float 5–7 reserved | NA (Byte: 6, Short:14) |
| 16:13 | 11 | Color0 | 0: three (r,g,b)<br>1: four (r,g,b,a) | 0: 16 bit 565 (three comp)<br>1: 24 bit 888 (three comp)<br>2: 32 bit 888x (three comp)<br>3: 16 bit 4444 (four comp)<br>4: 24 bit 6666 (four comp)<br>5: 32 bit 8888 (four comp) | NA |
| 20:17 | 12 | Color1 | 0: three (r,g,b)<br>1: four (r,g,b,a) | 0: 16 bit 565 (three comp)<br>1: 24 bit 888 (three comp)<br>2: 32 bit 888x (three comp)<br>3: 16 bit 4444 (four comp)<br>4: 24 bit 6666 (four comp)<br>5: 32 bit 8888 (four comp) | NA |
| 29:21 | 13 | Tex0Coord | 0: one (s)<br>1: two (s,t) | 0:ubyte 2:ushort 4:float<br>1:byte 3:short 5–7<br>reserved | Location of decimal point from LSB. This shift applies to all u/short components and to u/byte components where ByteDequant is asserted (Below). |
| 38:30 | 14 | Tex1Coord | 0: one (s)<br>1: two (s,t) | 0:ubyte 2:ushort 4:float<br>1:byte 3:short 5–7<br>reserved | Location of decimal point from LSB. This shift applies to all u/short components and to u/byte components where ByteDequant is asserted (Below). |

TABLE V-continued

| Bit field | Attribute number | Attribute name | .CompCount sub-field(0) | .CompSize sub-field(3:1) | .Shift amount sub-field(8:4) |
|---|---|---|---|---|---|
| 47:39 | 15 | Tex2Coord | 0: one (s)<br>1: two (s,t) | 0:ubyte  2:ushort  4:float<br>1:byte   3:short   5–7 reserved | Location of decimal point from LSB. This shift applies to all u/short components and to u/byte components where ByteDequant is asserted (Below). |
| 56:48 | 16 | Tex3Coord | 0: one (s)<br>1: two (s,t) | 0:ubyte  2:ushort  4:float<br>1:byte   3:short   5–7 reserved | Location of decimal point from LSB. This shift applies to all u/short components and to u/byte components where ByteDequant is asserted (Below). |
| 65:57 | 17 | Tex4Coord | 0: one (s)<br>1: two (s,t) | 0:ubyte  2:ushort  4:float<br>1:byte   3:short   5–7 reserved | Location of decimal point from LSB. This shift applies to all u/short components and to u/byte components where ByteDequant is asserted (Below). |
| 74:66 | 18 | Tex5Coord | 0: one (s)<br>1: two (s,t) | 0:ubyte  2:ushort  4:float<br>1:byte   3:short   5–7 reserved | Location of decimal point from LSB. This shift applies to all u/short components and to u/byte components where ByteDequant is asserted (Below). |
| 83:75 | 19 | Tex6Coord | 0: one (s)<br>1: two (s,t) | 0:ubyte  2:ushort  4:float<br>1:byte   3:short   5–7 reserved | Location of decimal point from LSB. This shift applies to all u/short components and to u/byte components where ByteDequant is asserted (Below). |
| 92:84 | 20 | Tex7Coord | 0: one (s)<br>1: two (s,t) | 0:ubyte  2:ushort  4:float<br>1:byte   3:short   5–7 reserved | Location of decimal point from LSB. This shift applies to all u/short components and to u/byte components where ByteDequant is asserted (Below). |
| 93:93 | FLAG | ByteDequant | (Rev B Only) | 0: Shift does not apply to u/byte<br>1: Shift does apply to u/byte | Shift applies for u/byte components of position and texture attributes. |
| 94:94 | FLAG | NormalIndex3 | (Rev B Only) | 0: Single index per Normal<br>1: Triple index per nine-Normal | When nine normals selected in indirect mode, input will be treated as three staggered indices (one per triple biased by component size), into normal table.<br>NOTE!!<br>First index internally biased by 0.<br>Second index internally biased by 1.<br>Third index internally biassed by 2. |

Defining and Drawing Graphics Primitives

FIG. 15 illustrates some of the different types of primitives supported by the graphics system 50, including:

GX_POINTS—draws a point at each of the n vertices.

GX_LINES—draws a series of unconnected line segments. Segments are drawn between v0 and v1, v2 and v3, etc. The number of vertices drawn should be a multiple of 2.

GX_LINESTRIP—draws a series of connected lines, from v0 to v1, then from v1 to v2, and so on. If n vertices are drawn, n-1 lines are drawn.

GX_TRIANGLES—draws a series of triangles (three-sided polygons) using vertices v0, v1, v2, then v3, v4, v5, and so on. The number of vertices drawn should be a multiple of 3 and the minimum number is 3.

GX_TRIANGLSTRIP—draws a series of triangles (three-sided polygons) using vertices v0, v1, v2, then v1, v3, v2 (note the order), then v2, v3, v4, and so on. The number of vertices must be at least 3.

GX_TRIANGLEFAN—draws a series of triangles (three-sided polygons) using vertices v0, v1, v2, then v0, v2, v3, and so on. The number of vertices must be at least 3.

GX_QUADS—draws a series of non-planar quadrilaterals (4-sided polygons) beginning with v0, v1, v2, v3, then v4, v5, v6, v7, and so on. The quad is actually drawn using two triangles, so the four vertices are not required to be coplanar. It is noted that the diagonal common edge between the two triangles of a quad is oriented as shown in FIG. 11. The minimum number of vertices is 4.

The application draws primitives by calling vertex functions (GXPosition, GXColor, etc.) between GXBegin/GXEnd pairs. The application should call a vertex function for each attribute it enables using GXSetVtxDesc( ). Each vertex function has a suffix of the form GXData[n][t], which describes the number (n) and type (t) of elements passed to the vertex function.

The following case fragment demonstrates how to draw primitives using vertex functions:

GXBegin(GX__TRIANGLES, GX__VTXFMT0, 3);
    GXPosition1x8(0); //index to position
    GXColor1x16(0); //index to color
    GXPosition1x8(1);
    GXColor1x16(1);
    GXPosition1x8(2);
    GXColor1x16(2);
    GXEnd( );

GXBegin specifies the type of primitive, an index into the VAT, and the number of vertices between the GXBegin/GXEnd pair. This information, along with the latest call to GXSetVtxDesc( ), fully describes the primitive, vertex, and attribute format. GXEnd( ) is actually a null macro that can be used to make sure that GXBegin and GXEnd are paired properly.

Loading a Projection Matrix

Figure 16:
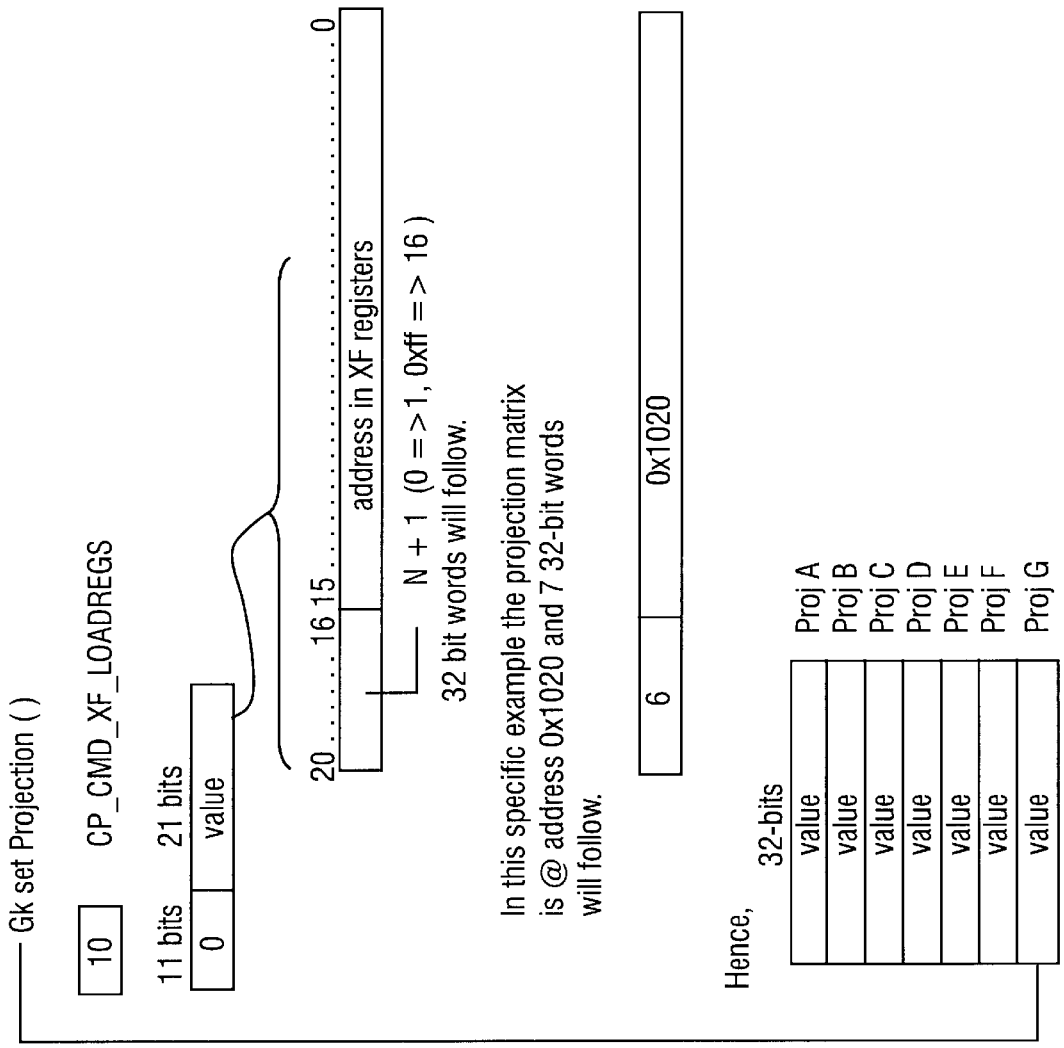
FIG. 16 shows an example binary level interface defining a projection matrix.

FIG. 16 shows an example binary bit stream used to load a projection matrix into transform unit 300 (see FIG. 8, block 1004). As described above in connection with FIG. 8, the application generally defines a projection matrix in order to transform a primitive from one space into another space (e.g., object space to world space). The transform unit 300 automatically transforms the vertices in the primitive using this projection matrix.

FIG. 16 shows an example binary bit stream that can be used to load a projection matrix into transform unit 300. In the example embodiment, this loading process involves sending a binary bit pattern of "0x10" to the graphics and audio processor 114 indicating "cp_cmd_xf_loadregs" followed by a 4-byte value. In this 4-byte value, the first eleven bits are 0 padding and the succeeding bits indicate a register address within the transform unit 300 (bits 0–15) and the number of 32-bit registers within the transform unit to be loaded (bits 16–19). Following these bit patterns are a sequence of from one to sixteen 32-bit words specifying projection matrix values.

In the example embodiment, every register in the transform unit 300 is mapped to a unique 32b address. All addresses are available to the xform register load command (command 0x30). The first block is formed by the matrix memory. Its address range is 0 to 1k, but only 256 entries are used. This memory is organized in a 64 entry by four 32b words. Each word has a unique address and is a single precision floating point number. For block writes, the addresses auto increment. The memory is implemented in less than 4-32b rams, then it is possible that the memory writes to this block will require a minimum write size larger than 1 word:

| Register Address | Definition | Configuration |
|---|---|---|
| 0x0000 | Matrix Ram word 0 | 32b matrix data |
| 0x0001-0x00ff | Matrix Ram word (n) | 32b matrix data |
| 0x0100-0x03ff | Not used | |

The second block of memory is mapped to the 1k~1.5k range. This memory is the normal matrix memory. It is organized as 32 rows of 3 words. Each word has a unique address and is a single precision floating point number. Also, each word written is 32b, but only the 20 most significant bits are kept. For simplicity, the minimum granularity of writes will be 3 words:

| Register Address | Definition | Configuration |
|---|---|---|
| 0x0400-0x402 | Normal Ram words 0,1,2 | 20b data |
| 0x0403-0x045f | Normal Ram word (n) | 20b data |
| 0x0460-0x05ff | Not used | |

The third block of memory holds the dual texture transform matrices. The format is identical to the first block of matrix memory. There are also 64 rows of 4 words for these matrices. These matrices can only be used for the dual transform of regular textures:

| Register Address | Definition | Configuration |
|---|---|---|
| 0x0500 | Matrix Ram word 0 | 32b matrix data |
| 0x0501-0x05ff | Matrix Ram word (n) | 32b matrix data |

The fourth block of memory is the light memory. This holds all the lighting information (light vectors, light parameters, etc.). Both global state and ambient state are stored in this memory. Each word written is 32b, but only the 20 most significant bits are kept. Each row is 3 words wide. Minimum word write size is 3 words.

Example Call Display List Command

Figure 17:
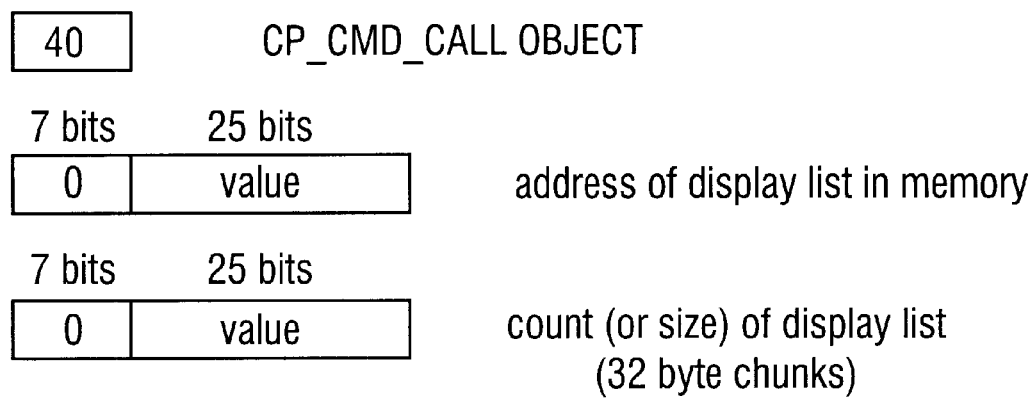
FIG. 17 shows an example binary level interface defining a display list to be called.

As described in the above-referenced patent application No. 09/726,215, filed Nov. 28, 2000 (atty. dkt. no. 723-959) entitled "Method and Apparatus for Buffering Graphics Data in a Graphics System," system 50 includes a capability for calling a display list. FIG. 17 shows an example binary bit stream format used to call a display object such as a display list. In the example shown, the binary bit pattern format includes an initial "0x40" indicating "CP_CMD_CALLOBJECT", followed by a 4-byte address of the display list in memory as well as a 4-byte count or size of the display list. The 4-byte address field may include an initial seven bits of 0 padding followed by a 25-bit value. The 4-byte count value may include an initial seven bits of padding followed by a 25-bit count value indicating the count or size of the display list in 32-byte chunks.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal to computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running as emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 18A:
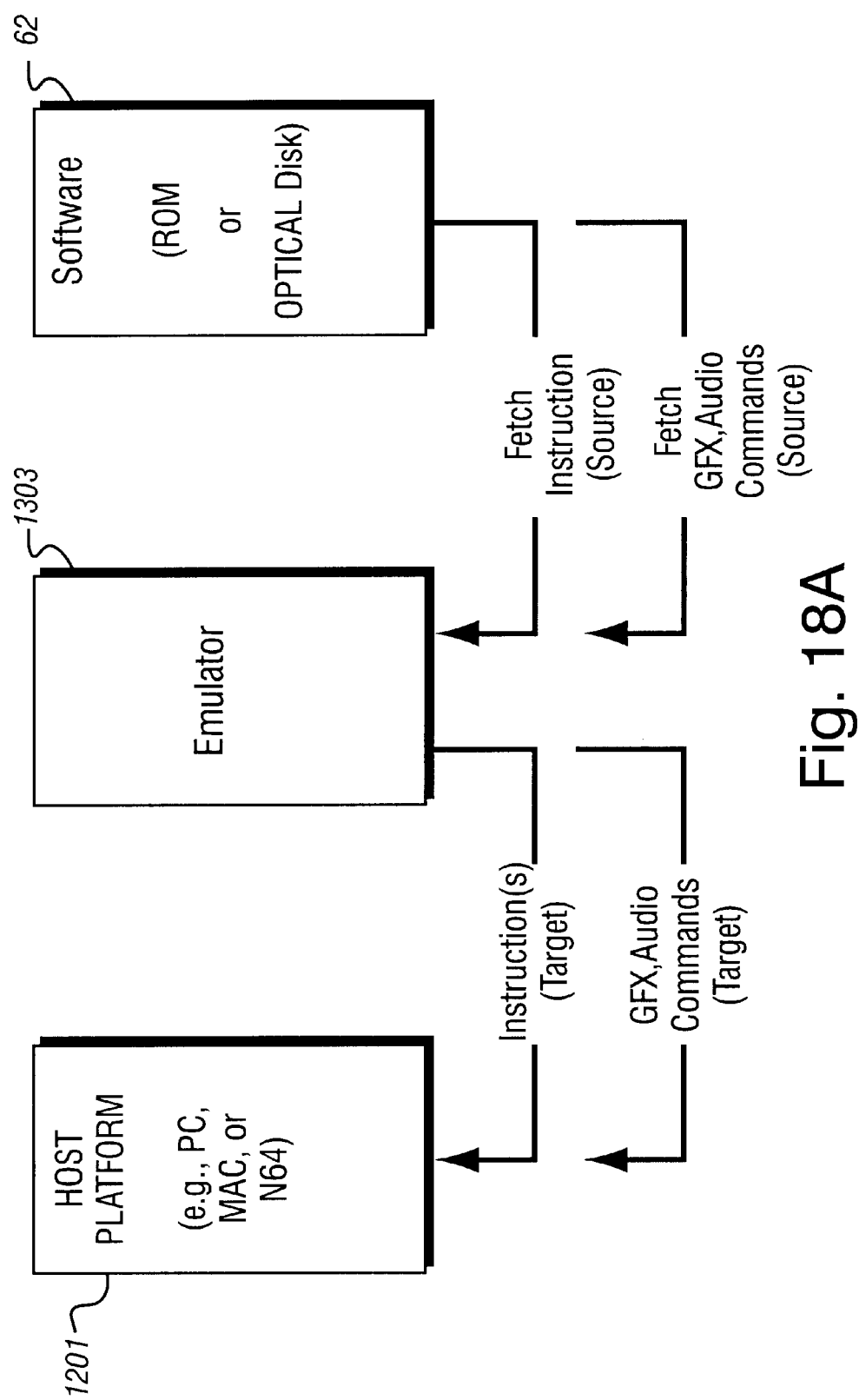
FIGS. 18A and 18B show example alternative compatible implementations.

FIG. 18A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1203 fetches one or a sequence of binary-image program instructions from storage medium 1305 and converts these program instructions to one or more equivalent Intel binary-image program instructions. The emulator 1203 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 18B:
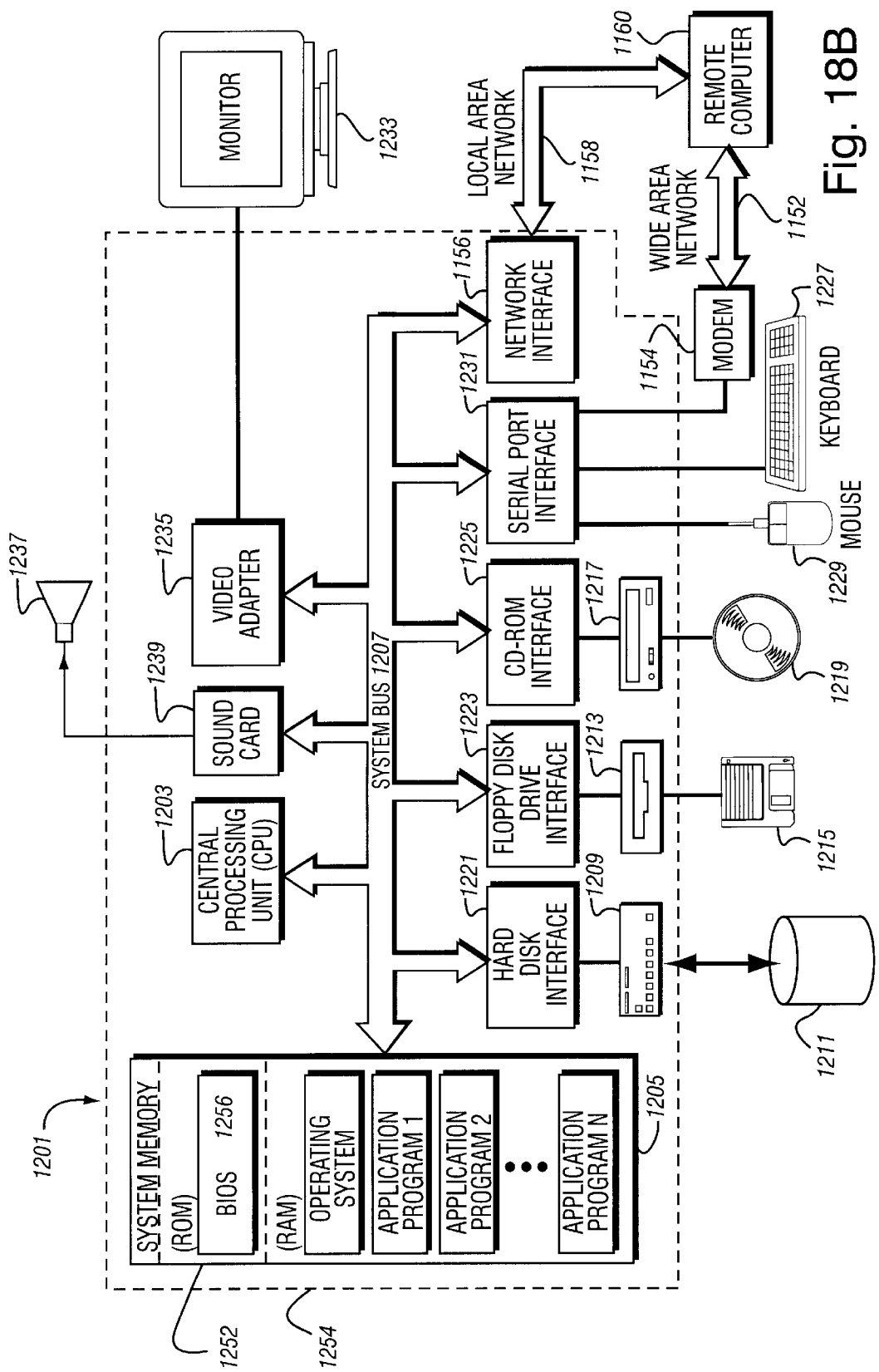

FIG. 18B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 1305.

Example Higher-Level API Cells

The following show example higher level API cells that a library interprets and/or computes to create the binary level command streams described above:

GXSetCopyClear

Argument:

| GXColor | ClearColor; | //Color value to clear the framebuffer to during copy. |
|---|---|---|
| u32 | ClearZ; | //24 bit Z value to clear the framebuffer to during copy. |

This sets the two clear values used for clearing the framebuffer during copy operations.

GXSetVtxDesc

Arguments:

| GXAttr | Attr; | //Which attribute (Position, Normal, Color, etc.) |
|---|---|---|
| GXAttrType | Type; | //Attribute Type (None, Direct, Indexed, etc.) |

This function is used for setting the type of a single attribute in the current vertex descriptor (i.e., vertex attribute register). The vertex attribute register defines which attributes are present in a vertex and how each attribute is referenced.

GXSetVtxAttrFmt

Argument:

| GXVtxFmt | vtxfmt; | //Index into the Vertex Attribute Table (0–7). |
|---|---|---|
| GXAttr | Attr; | //Attribute Type. |
| GXCompCnt | CompCnt; | //Number of components for the attribute. |
| GXCompType | CompType | //Type of each Component. |
| u8 | Shift; | //Locatin of decimal point for fixed point format types. |

This function sets the attribute format for a single attribute in the vertex attribute format table (VAT). There are 8 vertex formats in the VAT vertex attribute array. Each register describes the data type and component types of all attributes that can be used in a vertex packet. The application can pre-program all 8 registers and then select one of them during actual drawing of the geometry.

GXSetArray

Arguments:

| GXAttr | Attr; | //Attribute type. |
|---|---|---|
| u32 | Base; | //Address (25:0) of the attribute data array in main memory. |
| u8 | Stride; | //Number of bytes between successive elements in the attribute array. |

This function sets the address and stride of the data array in main memory for each indexed attribute. The system uses these arrays to get actual data when an indexed attribute is sent with a vertex packet.

GXSetProjection

Arguments:

| f32 | Matrix[4][4] | //Projection matrix. |
|---|---|---|
| GXProjMtxType | type; | //Indicates if the projection is orthographic. |

Sets projection matrix parameters. The projection matrix is specified as follows:

Perspective Projection:

$$\begin{bmatrix} X \\ Y \\ Z \\ W \end{bmatrix} = \begin{bmatrix} p0 & 0 & p1 & 0 \\ 0 & p2 & p3 & 0 \\ 0 & 0 & p4 & p5 \\ 0 & 0 & -1 & 0 \end{bmatrix} \begin{bmatrix} Xe \\ Ye \\ Ze \\ 1 \end{bmatrix}$$

Orthographic Projection:

$$\begin{bmatrix} X \\ Y \\ Z \\ W \end{bmatrix} = \begin{bmatrix} p0 & 0 & 0 & p1 \\ 0 & p2 & 0 & p3 \\ 0 & 0 & p4 & p5 \\ 0 & 0 & 0 & 1 \end{bmatrix} \begin{bmatrix} Xe \\ Ye \\ Ze \\ 1 \end{bmatrix}$$

All documents referred to herein are expressly incorporated by reference as if expressly set forth.

As used herein, the notation "0x" indicates a hexadecimal value. For example, "0x61" indicates a hexadecimal value. For example, "0x61" indicates a two-byte hexadecimal value of "61"—which people of ordinary skill in the art understand has a binary format of "01100001". See Table VI below for conversion of hexadecimal notation to binary notation:

TABLE VI

| Hex | Binary |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| A | 1010 |
| B | 1011 |
| C | 1100 |
| D | 1101 |
| B | 1110 |
| F | 1111 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A graphics system command stream for use in a graphics system to set an array, the command stream comprising:

an array base load register command comprising 0x08Ax, where the second-mentioned "x" after "A" encodes an attribute indicator, a 32-bit including a 26-bit address, a stream command 0x08Bx, where the second-mentioned "x" after "B" encodes an attribute indicator, and a succeeding 32-bit value including eight bits indicating a stride for an array, wherein upon executing of the command stream an array base and an array stride register are set for a vertex array.

2. A computer readable storage medium encoded with executable instructions for setting an array, comprising:

an array base load register comprising 0x08Ax, where the second-mentioned "x" after "A" encodes an attribute indicator, and a 32-bit value including a 26-bit address, a stream command 0x08Bx, where the second-mentioned "x" after "B" encodes an attribute indicator, and a succeeding 32 -bit value including eight bits indicating a stride for an array, wherein upon execution of the command stream an array base register and an array stride register are set for a vertex array.

3. A graphics command stream decoder comprising:

a first decoding section decoding an array base load register command comprising 0x08Ax, where the second-mentioned x encodes an attribute indicator, and a second decoding section decoding a 32-bit value including a 26-bit address, a third decoding section decoding a stream command 0x08Bx, where the second-mentioned x encodes an attribute indicator, and a fourth decoding section decoding a succeeding 32-bit value including eight bits indicating a stride for an array.

4. A method of setting an array in a graphics system using a graphics command stream comprising:

generating an array base load register comprising 0x08Ax, where the second-mentioned x encodes an attribute indicator, and generating a 32-bit value including a 26-bit address, generating a stream command 0x08Bx, where the second-mentioned x encodes an attribute indicator, and generating a succeeding 32-bit value including eight bits indicating a stride for an array, wherein upon execution of the command stream an array base register and an array stride register are set for a vertex array.

\* \* \* \* \*